Sept. 13, 1966   R. L. WILSON   3,272,565
RAILWAY FLUID PRESSURE BRAKE APPARATUS
Filed Aug. 31, 1964   2 Sheets-Sheet 2

INVENTOR.
Richard L. Wilson
BY Ralph W. McIntire, Jr.
Attorney

United States Patent Office 3,272,565
Patented Sept. 13, 1966

3,272,565
RAILWAY FLUID PRESSURE BRAKE APPARATUS
Richard L. Wilson, Trafford, Pa., assignor to Westinghouse Air Brake Company, Wilmerding, Pa., a corporation of Pennsylvania
Filed Aug. 31, 1964, Ser. No. 393,166
12 Claims. (Cl. 303—8)

This invention relates to a fluid pressure operated brake control valve device for railway vehicles wherein the degree of application and release of brakes on the vehicle is controlled according to the extent of reduction and restoration, respectively, in pressure of fluid in a brake pipe relative to pressure of fluid in a control reservoir, and more particularly to a brake control valve device that embodies therein a combined quick service and selector valve means and a quick release valve device.

The combined quick service and selector valve means of the brake control valve device used on most modern railway vehicles comprises a spool-type valve operated by an abutment, subject on one side to the pressure in a selector valve volume or reservoir normally open to the brake pipe, and on the opposite side to brake pipe pressure, in response to a service rate of brake pipe reduction, to cut off the brake pipe from a control reservoir and the selector valve volume which are charged therefrom under the control of the spool-type valve, and to simultaneously effect a local quick service reduction in brake pipe pressure and release of fluid under pressure from the selector valve volume to atmosphere until the pressure therein is reduced to substantially the reduced pressure in the brake pipe. This combined quick service and selector valve means is also operative, in response to an emergency rate of brake pipe reduction, to provide the same features obtained during a service brake application as described above, and also to bottle up the fluid under pressure in both the control reservoir and the selector valve volume to prevent unnecessary loss of fluid under pressure from these reservoirs.

Furthermore, the usual quick release valve device of the above-described brake control valve device comprises a pair of spaced-apart diaphragm-operated spool-type valves which are sequentially operable under the manual control of the engineer of a train to respectively effect a release of the brakes on the locomotive without effecting a release of the brakes on the cars in the train and a complete release of fluid under pressure from the control reservoir to atmosphere.

In actual practice it sometimes happens that the feed valve device of the engineer's brake valve device fails to properly regulate its delivery pressure which is supplied to charge the brake pipe and the brake equipment on the locomotive and cars in a train hauled thereby. Consequently, upon failure of the feed valve device to function properly, the brake pipe and brake equipment may become overcharged, which condition would be indicated to the engineer by an abnormally high reading of the brake pipe gauge located in the cab of the locomotive. Upon the engineer being thus apprised of the fact that the feed valve device has failed to function properly and that the brake pipe and brake equipment are overcharged as the result of the failure of the feed valve, he will make an emergency brake application to stop the train in order that the defective feed valve device can be repaired or replaced so that the fluid pressure in the brake equipment on the train can be properly regulated when the train is again started.

Subsequent to effecting an emergency brake application as described above, the hereinbefore-mentioned one side of the abutment of the combined quick service and selector valve means is subject to the abnormally high selector valve volume pressure resulting from the overcharge of the brake equipment caused by the prior failure of the feed valve device. Therefore, if the engineer moves the handle of the engineer's automatic brake valve device from its emergency position to its release position after the defective feed valve device has been repaired or replaced, the brake pipe will be charged to a pressure corresponding to the setting of the feed valve device, which pressure will be substantially less than the pressure presently in the selector valve volume as a result of the overcharge of the brake equipment and active on the hereinbefore-mentioned one side of the abutment of the combined quick service and selector valve means. Consequently, the flow of fluid under pressure from the now charged brake pipe to the opposite side of this abutment will be ineffective to cause the combined quick service and selector valve means to be moved from its emergency position to its release position in order to establish respectively the usual charging communication for the control reservoir and the selector valve volume. Furthermore, the fluid under pressure supplied from the brake pipe to the service valve portion of the brake control valve devices on the locomotive and cars in the train is ineffective to cause these brake control valve devices to operate to completely release the brakes on the vehicle on which they are installed, since the fully charged brake pipe pressure is less than the pressure in the control reservoir, which higher control reservoir pressure is the result of the overcharge of the brake equipment caused by the previously-mentioned failure of the feed valve device.

The brakes on the locomotive can now be released by the engineer depressing the handle of the engineer's independent brake valve device, and the brakes on each car in the train can be manually released by a trainman operating each corresponding control reservoir release valve device. Thus, releasing the brakes on the locomotive and cars in the train completely depletes the control reservoirs of fluid under pressure so that the corresponding brake control valve devices are ineffective to cause a brake application. Furthermore, manual operation of the control reservoir release valve device on each car of a train by the trainman is time consuming.

Accordingly, it is the general purpose of this invention to provide a fluid pressure operated brake control valve device for railway vehicles that has a combined quick service and selector valve means which is operative in response to either a service or emergency rate of brake pipe reduction to correspondingly reduce the pressure in the selector valve volume to a chosen lower pressure, which is less than the lowest normally fully charged brake pipe pressure used on American railroads, and thereafter retain this chosen lower pressure in the selector valve volume notwithstanding further reductions in brake pipe pressure thereby preventing unnecessary waste of fluid under pressure by completely depleting the selector valve volume and insuring that, upon recharging the brake pipe subsequent to repairing a defective feed valve device that caused an overcharge of the brake equipment, the combined quick service and selector valve means will be returned from its application position to its release position.

The fluid pressure operated brake control valve device of the present invention further includes a quick release valve device that embodies a spring-biased check valve device through which fluid under pressure is vented from the control reservoir to atmosphere when effecting an independent release of the locomotive brakes by manually depressing the handle of the engineer's independent brake valve device, this spring-biased check valve device thus serving to retain a chosen pressure in the control reservoir to insure than an automatic brake application to a degree corresponding to the retained control reservoir pressure can be obtained on the locomotive by operation of the engineer's automatic brake valve device subsequent to effecting an independent release of the locomotive brakes.

Essentially, the invention comprises a fluid pressure operated brake control valve device having a two-position combined quick service and selector valve means provided with a spring-loaded check valve device through which fluid under pressure from the selector valve volume is vented to atmosphere upon movement of the valve means to an application position thereby retaining a chosen pressure in the selector valve volume, and a quick release valve device that is provided with a spring-loaded check valve device through which fluid under pressure from the control reservoir is vented when effecting an independent release of the locomotive brakes to thereby retain sufficient fluid under pressure in the control reservoir for effecting a subsequent brake application by operation of the engineer's automatic brake valve device.

In the accompanying drawings:

FIG. 1 and FIG. 1A, when taken together such that the right-hand edge of FIG. 1 is matched with the left-hand edge of FIG. 2, constitute a diagrammatic view of a locomotive fluid pressure brake apparatus embodying the invention.

FIG. 2 is a fragmental view of an element of a brake control valve device constituting part of the locomotive fluid pressure brake apparatus shown in FIG. 1 showing the element in a different position in which it converts the brake control valve device so as to operate as a direct release brake control valve device as distinguished from a graduated release brake control valve device.

Description

Referring to the drawings, the locomotive fluid pressure brake apparatus embodying the invention comprises a brake pipe 1 that extends from the locomotive back through each car in a train, a brake cylinder device 2, a main reservoir 3, an auxiliary reservoir 4, a control reservoir 5, a selector volume reservoir 6, an engineer's brake valve device that includes an automatic brake valve device 7 for controlling the pressure in the brake pipe 1, an independent brake valve device 8 for controlling the brakes on the locomotive independently of the brakes on the cars in the train, and a pipe bracket 9 to which the two brake valve devices 7 and 8 are secured, and a brake control valve device 10 connected to the brake pipe 1 and controlled by variations of pressure therein.

The engineer's brake valve device is substantially the same in construction as the brake valve device shown and decribed in Patent No. 2,958,561, issued November 1, 1960, to Harry C. May, and assigned to the assignee of the present application. The automatic brake valve device 7 of the engineer's brake valve device comprises a sectionalized casing containing a relay valve device 11, a self-lapping control valve device 12, a brake pipe cut-off valve device 13, a vent valve 14, an emergency valve device 15, a suppression valve device 16, an equalizing reservoir cut-off valve device 17 for controlling flow of fluid under pressure to and from an equalizing reservoir 18, and a manually positionable selector valve device 19 for selectively conditioning the automatic brake valve device 7 for effecting either direct release operation of the brake control valve device on each car in a train of cars, if each car is provided with a direct release type brake control valve device, or graduated application and graduated release operation of the brake control valve device on each car if each car is provided with a graduated release type of brake control valve device, for cutting out control of brake pipe pressure by the automatic brake valve device 7 for multiple unit or trailing (pusher) unit operation, or for conducting a brake pipe leakage test, all of which valve devices may be identical in construction and operation to the corresponding devices shown in the abovementioned patent and therefore will not be described in detail herein. Secured to the pipe braket 9 by any suitable means (not shown) is the independent brake valve device 8 for permitting the fluid pressure brakes on the locomotive to be applied and released independently of those on the connected cars.

When a locomotive provided with the engineer's automatic brake valve device 7 is used to haul a train, the cars of which are provided with the familiar AB direct release type brake control valve device, in order to provide for a direct release of the brakes on the cars in the train, it is necessary that the manually positionable selector valve device 19 be set in one position which is referred to as freight position in the above-mentioned patent, to cause the equalizing reservoir cut-off valve device 17 to be held open only in the running position of an automatic brake valve handle 20, as is described in this patent. When the manually positionable selector valve device 19 is thus so set, the engineer on the locomotive, by proper manipulation of the brake valve handle 20, can effect a brake application on all the cars in the train and then subsequently effect only a direct release of the brakes on all three cars.

When each car in a train is provided with a brake control valve device of the graduated release type, it is necessary that the manually positionable selector valve 19 be set in another position, which is referred to in the hereinbefore-mentioned patent as passenger position, in order that the engineer may manipulate the automatic brake valve handle 20 to cause a graduated application and subsequently a graduated release operation of the brake control valve device on each of the cars in the train. As explained in detail in the hereinbefore-mentioned patent, when the manually positionable selector valve device 19 is moved to the position referred to in this patent as passenger position, the equalizing cut-off valve device 17 is held open in all positions of the brake valve handle 20. Therefore, upon movement of the handle 20 from the running position into the service zone toward full service position, the engineer can cause a graduated application of the brakes in steps, and also a full service application of the brakes upon moving the brake valve handle to its full service position. Subsequently, upon movement of the handle 20 reversely toward running position, the engineer can effect operation of the brake control valve device on each car in the train to cause a graduated release of the brakes on all of the cars.

Figure 1:
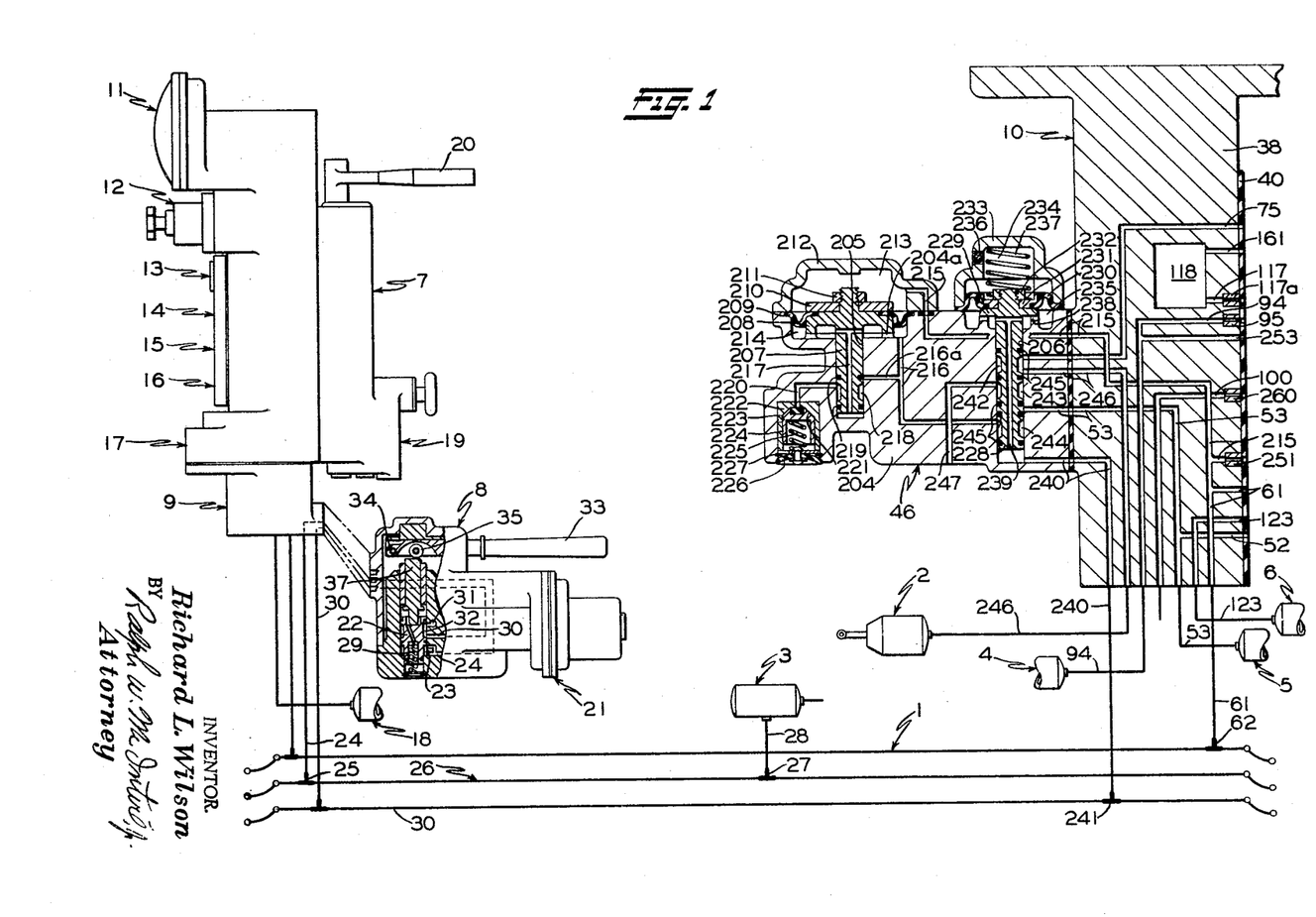
Figure 4A:
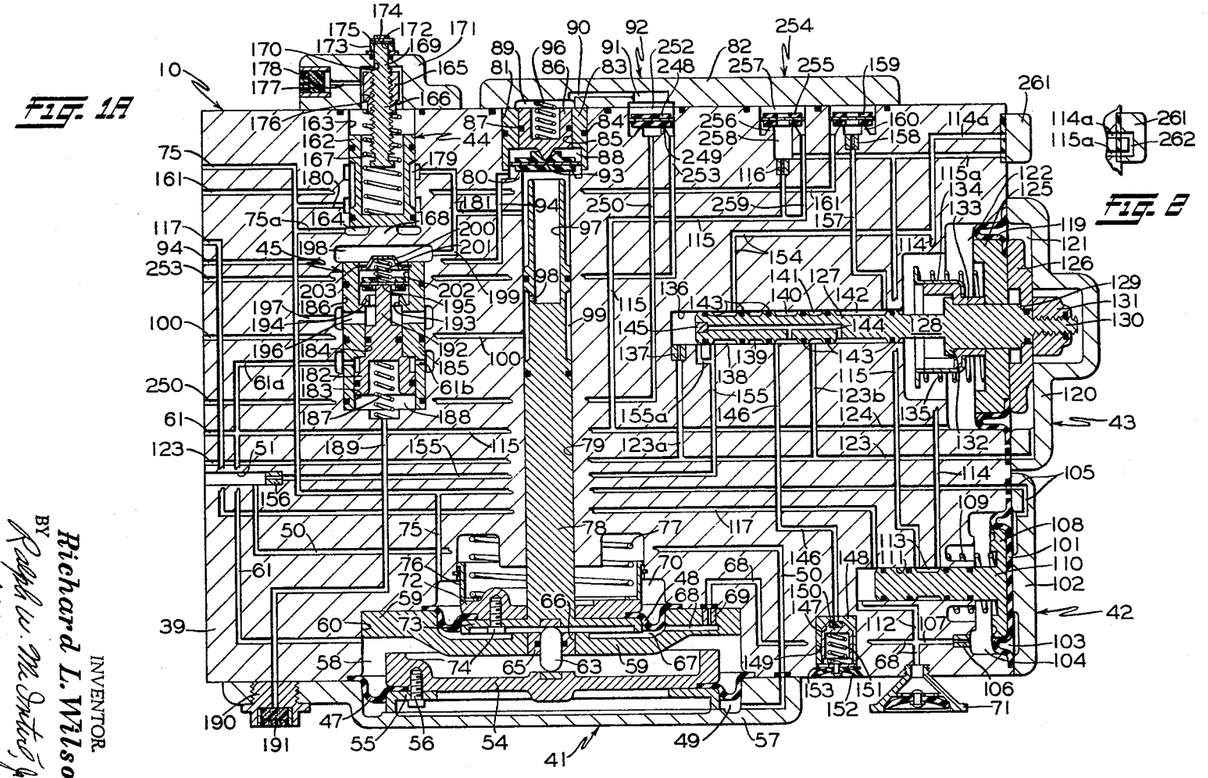

The independent brake valve device 8 comprises a self-lapping valve unit 21 which may be identical in construction and operation to the corresponding self-lapping valve unit shown in the above-mentioned patent No. 2,958,561 and, therefore, will not be described in detail herein. The independent brake valve device 8 further comprises a differential area piston-type independent release valve 22, reciprocal in a direction at right angles to the axis of the self-lapping valve unit 21. This release valve 22 has small and large diameter ends which are exposed to atmospheric pressure and has therebetween an annular chamber 23 which is constantly open to the main reservoir 3 via a passageway and corresponding pipe 24 that is connected to the side outlet of a pipe T 25 that is disposed in a main reservoir pipe 26 that extends from end to end of the locomotive and has disposed therein a second pipe T 27 to the side outlet of which is connected one end of a pipe 28 that has its opposite end connected to the main reservoir 3. A bias spring 29 acting on the small end of the release valve 22 and assisted by main reservoir pressure in the annular chamber 23 urges the release valve 22 to a normal position, in which it is shown in FIG. 1. In this position, an actuating passageway and corresponding pipe 30 are connected to an atmospheric vent port 31 by a peripheral annular groove 32 formed on the release valve 22. A brake valve handle 33 is hinged on a pin 34 and also carries a roller 35 which, upon manual depression of the handle 33 to rock it about the pin 34, acts through a pusher stem 37 to shift release valve 22 to an independent release position against the pressure of the spring 29 and fluid under pressure from the main reservoir acting in the annular chamber 23. In this position, the peripheral annular groove 32 connects the main reservoir passage 24 to the actuating passageway and pipe 30 for charging the latter.

The handle 33 of the independent brake valve device 8 is depressible, irrespective of its arcuate position, to cause independent release valve 22 to be moved downward to a position in which the peripheral annular groove 32 thereon establishes a communication between the passageway 24 and the passageway 30 to thereby charge the normally vented corresponding actuating pipe 30 with fluid at main reservoir pressure and thus effect an independent release of the fluid pressure brakes on the locomotive, in a manner hereinafter described.

As shown in FIGS. 1 and 1A of the drawings, the brake control valve device 10 embodying the invention comprises a pipe bracket 38 (FIG. 1) to which are connected a branch of the usual brake pipe 1, the auxiliary reservoir 4, control reservoir 5, selector volume reservoir 6, and the brake cylinder device 2. Mounted on the right-hand face of the pipe bracket 38 is a sectionalized casing 39 (FIG. 1A) that is secured to the pipe bracket 38 by any suitable means (not shown), there being a sealing gasket 40 (FIG. 1) interposed between the pipe bracket 38 and the sectionalized casing 39. The sectionalized casing 39 contains a service valve device 41, a combined charging and quick service cut-off valve device 42, a combined quick service and selector valve device 43, a service brake cylinder pressure limiting valve device 44, and an emergency brake cylinder limiting valve device 45. Mounted on the left-hand face of the pipe bracket 38 is a quick release valve device 46 (FIG. 1).

The service valve device 41 comprises two coaxially arranged movable abutments or diaphragms 47 and 48 of different effective areas cooperatively, though not positively, connected so as to constitute a stack, as will be understood from subsequent description. The larger movable abutment 47 has at one side a chamber 49 that is constantly open to the control reservoir 5 via a passageway 50 that extends through the sectionalized casing 39 and opens at the wall surface of a counterbore 51 extending inward from the left-hand end of the sectionalized casing 39. Formed in the pipe bracket 38 and opening at one end into the counterbore 51 is one end of a passageway 52 that, in turn, is connected at its opposite end to a second passageway 53 in the pipe bracket 38. This passageway 53 is connected by a pipe bearing the same numeral to the control reservoir 5.

A diaphragm follower 54 is operatively connected to the center of the diaphragm 47 by means such as a diaphragm follower plate 55 and a plurality of cap screws 56, only one of which appears in FIG. 1A of the drawings, that pass through corresponding smooth bores in the diaphragm follower plate 55 and have screw-threaded engagement with coaxial screw-threaded bores in the diaphragm follower 54. The periphery of the diaphragm 47 is clamped between the bottom face of the sectionalized casing 39 and a cover 57 which is secured thereto by any suitable means (not shown). The diaphragm 47 cooperates with the sectionalized casing 39 and the cover 57 to form within the service valve device 41 and on opposite sides of the diaphragm the chamber 49 and a chamber 58 that is formed by the cooperative relationship of the diaphragm 47, diaphragm follower 54, and an annular casing partition 59 that is disposed in a bore 60 formed in the sectionalized casing 39. The chamber 58 is constantly open to the brake pipe 1 via a passageway 61 that extends through the sectionalized casing 39 and the pipe bracket 38 and is connected by a pipe bearing the same numeral to the side outlet of a pipe T 62 that is disposed in the brake pipe 1. A cylindrical pusher stem 63 arranged coaxially with the movable abutments 47 and 48 has sealing, slidably guided contact with the wall of an aligned bore through a bushing 65 that is press-fitted into a bore 66 formed in the annular casing partition 59 and coaxial with the diaphragms 47 and 48. The annular casing partition 59 separates the chamber 58 from an atmospheric chamber 67 that is open to the atmosphere via a passageway 68 that extends through the sectionalized casing 39 and annular casing partition 59. That portion of the passageway 68 formed in the annular casing partition 59 has disposed therein a choke 69, the purpose of which is to control the rate of flow of fluid under pressure from a chamber 70 formed above the diaphragm 48 should the diaphragm 48 become ruptured. That end of the passageway 68, opposite the end adjacent the choke 69, is open to atmosphere through an insect excluder device 71 which may be of the usual construction. The chamber 70 is formed by the cooperative relation of the sectionalized casing 39, the diaphragm 48, and a diaphragm follower plate 72 to which a diaphragm follower 73 is secured by a plurality of cap screws 74, only one of which appears in FIG. 1A of the drawings, these cap screws serving to clamp the inner periphery of the diaphragm 48 between the diaphragm follower plate 72 and the diaphragm follower 73. Opening into the chamber 70 is one end of a passageway 75 that extends through the sectionalized casing 39 and the pipe bracket 38 and is connected via the quick release valve device 46, in a manner hereinafter described, to the brake cylinder device 2. Disposed within the chamber 70, between the casing section 39 and a hollow spring seat 76, is a spring 77 for biasing the spring seat 76 against the diaphragm follower plate 72 and thereby biasing the diaphragm 48 and the diaphragm follower 73, which has formed integral therewith a valve stem 78, in a downward direction. The valve stem 78 extends through a bore 79 formed in the sectionalized casing 39. The bore 79 opens at its lower end into the chamber 70 and has formed at its upper end an annular valve seat 80. The sectionalized casing 39 is provided with a counterbore 81 that is coaxial with the annular valve seat 80. Disposed in the counterbore 81, the outer end of which is closed by a cover 82 secured to the sectionalized casing 39 by any suitable means (not shown), is a bushing 83 having a groove in the periphery thereof, in which groove is carried an O-ring 84 to prevent leakage of fluid under pressure along the counterbore 81 between the bushing 83 and the wall of the counterbore 81 in the sectionalized casing 39. The bushing 83 is provided with a bore 85 in which is slidably mounted a piston 86 that is provided with a peripheral annular groove in which is disposed an O-ring 87 to prevent leakage of fluid under pressure from a chamber 88 below the piston to a chamber 89 above the piston 86, which chamber 89 is connected by a passageway 90 in the cover 82 to an outlet chamber 91 of an auxiliary reservoir charging check valve device 92 hereinafter described in detail. Fluid under pressure supplied through the auxiliary reservoir charging check valve device 92, in a manner hereinafter described, will flow through the passageway 90 to the chamber 89 and act on top of the piston 86 to balance the pressure acting on a flat disc-type valve 93 disposed in the chamber 88 when the flat disc-type valve 93 is unseated from the annular valve seat 80, since the chamber 88 is constantly supplied with fluid under pressure from the auxiliary reservoir 4 via a pipe and corresponding passageway 94 that extends through the sectionalized casing 39 and the pipe bracket 39 and has disposed therein a service choke 95 carried by the pipe bracket portion 38. A spring 96 is interposed between the cover 82 and the upper side of the piston 86 to bias this piston and the flat disc-type valve 93 downward, so that the flat disc-type valve 93 is moved into contact with the annular valve seat 80 except when unseated therefrom, in a manner hereinafter described.

The upper end of the stem 78 is provided with a portion of reduced diameter into which extends a counterbore 97, the bottom of which is opened via a radial port 98 to a peripheral annular groove 99 formed on the stem 78. While the stem 78 occupies the position in which it is shown in FIG. 1A, the interior of the counterbore 97 is connected via the port 98 and peripheral annular groove 99 to a passageway 100 which extends through the sectionalized casing 39 and the pipe bracket 38 and has one end open at the wall surface of the bore 79 and the other end open to the exterior of the pipe bracket 38.

The combined charging and quick service cut-off valve device 42 comprises a movable abutment 101, the outer periphery of which is clamped between the sectionalized casing 39 and a cover 102. The diaphragm 101 cooperates with the sectionalized casing 39 and the cover 102 to form on opposite sides of the diaphragm two chambers 103 and 104. The chamber 103 is connected via a passageway 105 extending through the cover 102 and the sectionalized casing 39 to the passageway 75 in the sectionalized casing 39, and the chamber 104 is constantly open via a choke 106 and a passageway 107 extending through the sectionalized casing 39 to the passageway 68 therein which is connected to atmosphere via the insect excluder device 71, as hereinbefore explained. Disposed in the chamber 104 and interposed between the sectionalized casing 39 and a diaphragm follower 108 is a spring 109 that surrounds a spool-type charging and quick service cut-off valve 110 that is formed integral with the diaphragm follower 108 and is slidably mounted in a counterbore 111 formed in the sectionalized casing 39, the open end of said counterbore opening into the chamber 104. The opposite end or bottom of the counterbore 111 is open to atmosphere via a passageway 112 extending through the sectionalized casing 39 to the passageway 68 which, as hereinbefore stated, is open to atmosphere via the insect excluder device 71. When pressure in the chamber 103 is less than a chosen value, the spool-type charging and quick service cut-off valve 110 will be biased by the spring 109 to a charging position, in which it is shown in FIG. 1A of the drawings. With the spool-type charging and quick service cut-off valve 110 in this position, a peripheral annular groove 113 formed thereon connects a passageway 114 in the sectionalized casing 39 with a passageway 115 that is also in this sectionalized casing. The passageway 115 has disposed therein a control reservoir slow charging choke 116 and is connected to the hereinbefore-mentioned passageway 61 that is supplied with fluid under pressure from the brake pipe 1. While the spool-type charging and quick service cut-off valve 110 occupies the position in which it is shown in FIG. 1A, the left-hand end thereof uncovers one end of a passageway 117 in the sectionalized casing 39 and the pipe bracket 38, the opposite end of which opens into a quick service volume 118 formed in the pipe bracket 38, this passageway 117 having therein a continued quick service reduction choke 117a, which choke is carried by the pipe bracket 38.

According to a feature of the invention, the combined quick service and selector valve device 43 comprises a movable abutment or diaphragm 119, the outer periphery of which is clamped between the sectionalized casing 39 and a cup-shaped cover 120. The diaphragm 119 cooperates respectively with the sectionalized casing 39 and the cup-shaped cover 120 to form on opposite sides of the diaphragm two chambers 121 and 122. The chamber 121 is open via a passageway 123 extending through the sectionalized casing 39 and the pipe bracket 38 and a pipe bearing the same numeral to the selector volume reservoir 6, and the chamber 122 is connected via a passageway 124 extending through the sectionalized casing 39 to the hereinbefore-mentioned passageway 115 therein.

The center of the diaphragm 119 is clamped between a diaphragm follower 125 and a diaphragm follower plate 126, each of which has a central bore. Coaxially attached to the diaphragm 119 is a spool-type combined quick service and selector valve 127 having at its right-hand end a stem 128 that extends into the chamber 122.

The stem 128 is provided with a stepped portion that extends through the bore in the diaphragm follower plate 126 which rests against a shoulder 129 formed at the left-hand end of the stepped portion. This first stepped portion of the stem 128 has extending therefrom a screw-threaded portion 130 with which a nut 131 has screw-threaded engagement to secure the diaphragm follower plate 126 against the shoulder 129. The stem 128 is provided with a collar 132 between which and the diaphragm follower 125 is disposed a sleeve-like strut 133 having at its left-hand end an outturned cup-like annular flange against the right-hand side of which rests an inturned flange formed at one end of a spring seat 134 that is provided at its opposite end with an outturned annular flange. Disposed in surrounding relation to the sleeve-like strut 133 and interposed between the diaphragm follower 125 and the outturned annular flange on the spring seat 134 is a spring 135 which is effective to normally urge the inturned flange on the spring seat 134 toward and into contact with the outturned cup-like flange on the strut 133, it being noted that the spring seat 134 extends in the direction of the left hand beyond the left-hand end of the outturned cup-like annular flange on strut 133.

The spool-type combined quick service and selector valve 127 is slidably disposed in a counterbore 136 extending into the sectionalized casing 39 from the chamber 122. The bottom or left-hand end of the counterbore 136 is open via a selector volume charging choke 137 to a first branch passageway 123a of the hereinbefore-mentioned passageway 123 in the sectionalized casing 39.

The spool-type combined quick service and selector valve 127 has five spaced-apart elongated peripheral annular grooves 138, 139, 140, 141 and 142 formed thereon. Between the adjacent ends of these elongated peripheral annular grooves, and also adjacent the left-hand end of the elongated groove 138 and the right-hand end of the elongated groove 142, the spool-type combined quick service and selector valve 127 has a peripheral annular groove in each of which is disposed an O-ring 143.

The spool-type combined quick service and selector valve 127 is provided with a central counterbore 144 extending inward from the left-hand end thereof, which counterbore is constantly open via suitable radial ports to the elongated peripheral annular grooves 140 and 142. The left-hand end of the counterbore 144 is closed by a plug 145 press-fitted thereinto.

While the spool-type combined quick service and selector valve 127 occupies the position in which it is shown in FIG. 1A of the drawings, the peripheral annular groove 140 thereon is in registry with a passageway 146 formed in the sectionalized casing 39 and opening at one end at the wall surface of the counterbore 136 and at the opposite end within an annular conical valve seat 147 formed on the interior of and at one end of a bushing 148 that is press-fitted into a counterbore 149 in the sectionalized casing 39. Slidably mounted in the bushing 148 is a conical-type check valve 150 which is normally biased into contact with the conical valve seat 147 by a spring 151 interposed between the check valve 150 and an insect excluder device 152 that is retained in the counterbore 149 by a snap ring 153 that is inserted in a groove formed in the wall of this counterbore. The strength of spring 151 is such as to retain a chosen pressure, such as, for example, forty-five pounds per square inch, in the passageway 146 and in the selector volume reservoir 6 when the spool-type combined quick service and selector valve 127 is moved, in a manner hereinafter described in detail, from the position in which it is shown in FIG. 1A to a second position in which a branch passageway 123b of the passageway 123 is connected to the passageway 146 via the peripheral annular groove 142, central counterbore 144 and the peripheral annular groove 140.

Also, while the spool-type combined quick service and selector valve 127 occupies the position in which it is shown in FIG. 1A, the peripheral annular groove 138 thereon establishes a communication between two passageways 154 and 155 formed in the sectionalized casing 39, one end of each of which passageways opens at the wall surface of the counterbore 136 between the ends of the peripheral annular groove 138. The other end of the passageway 154 opens into the hereinbefore-mentioned passageway 114 in the sectionalized casing 39, and the other end of the passageway 155 opens via an overcharge dissipation choke 156 into the hereinbefore-mentioned counterbore 51 in the sectionalized casing 39. The passageway 155 has a branch passageway 155a that opens at the wall surface of the counterbore 136 intermediate the locations at which the selector volume charging choke 137 and the above-mentioned one end of the passageway 155 open at the wall surface of the counterbore 136.

Furthermore, while the spool-type combined quick service and selector valve 127 occupies the position in which it is shown in FIG. 1A, the peripheral annular groove 142 thereon is in a position in which the O-ring 143 adjacent the right-hand end thereof forms a seal with the wall surface of the counterbore 136 to close communication between a passageway 157 in the sectionalized casing 39, one end of which opens at the wall surface of the counterbore 136 and the chamber 122. The opposite end of the passageway 157 is open via a quick service reduction choke 158 to the inner seated area of a flat disc-type check valve 159 that normally rests against an annular valve seat 160. The outlet side of the flat disc-type check valve 159 is connected via a passageway 161 extending through the sectionalized casing 39 and the pipe bracket 38 to the hereinbefore-mentioned quick service volume 118.

The service brake cylinder limiting valve device 44 comprises a movable abutment in the form of a cup-shaped cylindrical piston member 162 that is slidably mounted in a counterbore 163 formed in the sectionalized casing 39 and is subject to fluid under pressure in a chamber 164 therebelow, into which chamber opens one end of a branch passageway 75a of the passageway 75 in the sectionalized casing 39. Interposed between the upper side of the cup-shaped cylindrical piston member 162 and a nut 165 that has screw-threaded engagement with a screw-threaded rod 166 is a spring 167 which is effective to normally bias the piston member 162 against a stop 168 formed integral with the sectionalized casing 39. The upper end of the screw-threaded rod 166 is provided with a stem 169, the diameter of which is less than that of the rod. The stem 169 extends through a bore 170 in a cover member 171 and a coaxial bore 172 of the same diameter in a sleeve member 173 that is locked in place by a pin 174 that extends through a crosswise bore 175 adjacent the upper end of the stem 169, which pin has its opposite ends overlying the upper end of the sleeve member 173. The upper end of the counterbore 163 is open to atmosphere via a coaxial counterbore 176 and a passageway 177 formed in the cover member 171 and an insect excluder device 178 carried by the cover member.

The cup-shaped cylindrical piston member 162 is provided with an elongated peripheral annular groove 179 which, while the piston member 162 occupies the position in which it is shown in FIG. 1A, establishes a communication between two passageways 180 and 181 formed in the sectionalized casing 39, each of which has one end opening at the wall surface of the counterbore 163. The opposite end of the passageway 180 opens into the hereinbefore-mentioned passageway 75, and the opposite end of the passageway 181 opens at the wall surface of the bore 79.

The emergency brake cylinder limiting valve device 45 may comprise a movable abutment in the form of a differential piston member 182 slidably mounted in two concentric counterbores 183 and 184 of unequal diameter formed in a bushing 185 that is press-fitted into a counterbore 186 formed in the sectionalized casing 39. That portion of the differential piston member 182 that is slidably mounted in the counterbore 183 is subject on its upper side to the pressure of the fluid in the brake pipe 1, which fluid under pressure is supplied thereto via a branch passageway 61a of the hereinbefore-mentioned passageway 61 and a plurality of arcuately spaced ports 61b in the bushing 185, and on its lower side to the force of a spring 187 disposed in a chamber 188 that is open to atmosphere via a passageway 189 extending through the sectionalized casing 39 and a screw-threaded plug 190 carried by the cover 57 and an insect excluder device 191 carried by the plug 190. Formed integral with the differential piston member 182 is a stem 192 that extends through a bore 193 in the bushing 185, which bore is coaxial with the counterbores 183 and 184 in this bushing, and at the upper end of which bore 193 is formed an annular valve seat 194.

While the differential piston member 182 occupies the position in which it is shown in FIG. 1A of the drawings, the stem 192 is effective to maintain a flat disc-type valve 195 out of seating contact with the annular valve seat 194 to thereby establish a communication between the interior of the counterbore 184, which is connected to the passageway 75 via a plurality of arcuately-spaced ports 196 formed in the bushing 185 and a passageway 197 in the sectionalized casing 39, and a chamber 198 into which opens one end of a passageway 199, the opposite end of which opens into the hereinbefore-mentioned passageway 181.

Interposed between the flat disc-type valve 195 and a spring seat 200 is a spring 201 for biasing the valve 195 toward the annular valve seat 194 and into contact with the upper end of the stem 192. The spring seat 200 is retained in a counterbore 202 formed in the upper end of the bushing 185 by a snap ring 203 that is inserted in a groove in the counterbore 202.

The quick release valve device 46 (FIG. 1) comprises a casing 204 provided with two parallel spaced-apart counterbores 205 and 206. Reciprocably mounted in the bore 205 is a spool-type quick release valve 207 that has formed integral therewith at its upper end a diaphragm follower 208 which is operatively connected to the center of a movable abutment or diaphragm 209 by means such as a diaphragm follower plate 210 and a nut 211 that has screw-threaded engagement with a screw-threaded stem integral with the diaphragm follower 208 and extending through a bore in the diaphragm follower plate 210. The outer periphery of the diaphragm 209 is clamped between the upper side of the casing 204 and a cover 212 that is secured to the casing 204 by any suitable means (not shown).

The diaphragm 209 cooperates with the casing 204 and the cover 212 to form on the respective opposite sides of the diaphragm two chambers 213 and 214. The chamber 213 is constantly connected to the brake pipe 1 via a passageway 215 extending through the cover 212, casing 204, and pipe bracket 38, which passageway 215 opens at one end into the chamber 213 and at the opposite end into the hereinbefore-mentioned passageway 61 which is connected by the pipe bearing the same numeral to the side outlet of the pipe T 62 disposed in the brake pipe 1. Opening into the chamber 214 is one end of a passageway 216 that extends through the casing 204 and opens at its opposite end at the wall surface of the counterbore 206.

The spool-type quick release valve 207 is provided with an internal passageway 217 via which fluid under pressure is supplied from the chamber 214 to the bottom of the counterbore 205, and with an elongated peripheral annular groove 218 adjacent the lower end thereof. The spool-type quick release valve 207 is also provided with a peripheral annular groove adjacent each end of the elongated peripheral annular groove 218, in which grooves is disposed an O-ring 219 that forms a seal with the wall surface of the counterbore 205 to prevent leakage of fluid under pressure between the spool-type valve 207 and the wall surface.

Opening at the wall surface of the counterbore 205 is one of a branch passageway 216a of the hereinbefore-mentioned passageway 216 and one end of a passageway 220, the opposite end of which opens within an annular conical valve seat 221 formed on the interior and at one end of a bushing 222 that is press-fitted into a counterbore 223 in the casing 204. Slidably mounted in the bushing 222 is a conical-type check valve 224 which is normally biased into contact with the conical valve seat 221 by a spring 225 interposed between the check valve 224 and an insect excluder device 226 that is retained in the counterbore 223 by a snap ring 227 that is inserted in a groove formed in the wall of this counterbore. The strength of spring 225 is such as to retain a chosen pressure, such as, for example, twenty pounds per square inch, in the passageway 220 and in the control reservoir 5 which is connected to this passageway when effecting an independent release of the locomotive brakes, in a manner hereinafter described.

Slidably mounted in the counterbore 206 is a spool-type release selector valve 228 which has formed integral therewith at the upper end thereof a diaphragm follower 229 that is operatively connected to the center of a movable abutment or diaphragm 230 by means such as a diaphragm follower plate 231 and a nut 232 that has screw-threaded engagement with a screw-threaded stem integral with the diaphragm follower 229 and extending through a bore in the diaphragm follower plate 231. The outer periphery of the diaphragm 230 is clamped between the upper side of the casing 204 and a cover 233 that is secured to the casing 204 by any suitable means (not shown).

The diaphragm 230 cooperates with the casing 204 and cover 233 to form within the quick release valve device 48 and on opposite sides of the diaphragm two chambers 234 and 235. Disposed within the chamber 234 between the diaphragm follower plate 231 and the cover 233 that carries an insect excluder device 236 through which the chamber 234 is open to atmosphere, is a spring 237 that is effective to normally bias the diaphragm follower 229 into contact with a stop 238 that is formed integral with the casing 204.

Spool-type release selector valve 228 has a suitable internal passageway 239 via which the chamber 235 is constantly open to the bottom of the counterbore 206, into which opens one end of a passageway 240 that extends through the casing 204 and pipe bracket 38 and is connected by a pipe bearing the same numeral to the side outlet of a pipe T 241 that is disposed in the hereinbefore-mentioned actuating pipe 30. The spool-type release selector valve 228 also has formed thereon three spaced-apart elongated peripheral annular grooves 242, 243 and 244. Between the adjacent ends of these elongated peripheral annular groves, and also adjacent the upper end of the elongated groove 242 and the lower end of the elongated groove 244, the release selector valve 228 is provided with a peripheral annular groove in each of which is disposed an O-ring 245 that forms a seal with the wall of the counterbore 206.

While the chamber 235 is vented to atmosphere via the internal passageway 239 in the release selector valve 228, the lower end of counterbore 206, passageway and pipe 240, pipe T 241, actuating pipe 30, and corresponding passageway in the independent brake valve device 8, peripheral annular groove 32 formed on the release valve 22 and atmosphereic vent port 31, the spring 237 will bias the diaphragm 230 and thereby the release selector valve 228 to a normal position in which they are shown in FIG. 1, in which position elongated peripheral annular groove 242 connects the passageway 75 to a passageway 246 that extends through the casing 204 and pipe bracket 38 and is connected by a pipe bearing the same numeral to the brake cylinder device 2. Also, in this position of the release selector valve 228, the elongated peripheral annular groove 243 thereon cuts off communication between the passageway 246 and an atmospheric vent passageway 247 opening at one end at the wall surface of the counterbore 206 and at the opposite end to the exterior of the casing 204, and the elongated peripheral annular groove 244 thereon cuts off communication between the passageway 216 and the hereinbefore-mentioned passageway 53 in the pipe bracket 38, which passageway extends through the casing 204 and opens at one end at the wall surface of the counterbore 206.

The hereinbefore-mentioned auxiliary reservoir charging check valve device 92 (FIG. 1A) comprises a flat disc-type valve 248 that normally has seated contact with an annular valve seat 249 formed adjacent one end of a passageway 250 in the sectionalized casing 39, the opposite end of which is connected through an auxiliary reservoir charging choke 251 (FIG. 1) carried by the pipe bracket 38 to a branch of the hereinbefore-mentioned passageway 215 in the pipe bracket, which passageway is constantly connected to the brake pipe 1, as hereinbefore explained. Therefore, upon build-up of pressure in the brake pipe 1, the flat disc-type valve 248 is moved away from the annular valve seat 249 to permit a one-way flow of fluid under pressure from the passageway 250 to an outlet chamber 252. The outlet chamber 252 is in constant communication with the auxiliary reservoir 4 by way of a passageway 253 that extends through the sectionalized casing 39 and the pipe bracket 38 to the hereinbefore-mentioned passageway 94 which is connected by a pipe bearing the same numeral to the auxiliary reservoir 4.

The brake control valve device 10 further includes a control reservoir dissipation check valve device 254 that is connected in by-passing relation to the control reservoir slow charging choke 116. The control reservoir dissipation check valve device 254 comprises a flat disc-type valve 255 that normally has seated contact with an annular valve seat 256 to close communication between a chamber 257 and a chamber 258 to which fluid under pressure is supplied from the brake pipe 1 at a rate controlled by the size of the control reservoir slow charging choke 116 and from which chamber fluid under pressure flows to the combined charging and quick service cut-off valve device 42 via a portion of the passageway 115 that extends from the chamber 258 to the opening of one end thereof at the wall surface of the counterbore 111. Opening into the chamber 257 is one end of a passage 259, the opposite end of which opens into the passageway 115 on the brake pipe side of the control reservoir slow charging choke 116.

It will be understood that the brake control valve device 10 described above is for use on locomotives. However, a brake control valve device which omits the quick release valve device 46 but includes the spring-loaded check valve 150 to retain a chosen pressure in the selector volume reservoir 6 whenever a brake application is effected to insure that, upon recharging the brake pipe subsequent to an overcharge of the brake equipment as the result of a defective feed valve device, the combined quick service and selector valve device of the brake control valve device will be returned from its application position to its release position, is suitable for use on railway passenger cars.

OPERATION
Initial charging

Let it be assumed that the manually positionable selector valve 19 of the engineer's automatic brake valve device 7 located on the locomotive is set in that one of its positions referred to in the hereinbefore-mentioned Patent No. 2,958,561 as passenger position, so that this brake valve device is conditioned to control graduated release operation of the brakes on the locomotive and cars in a train hauled thereby.

Assume additionally that all the passageways and chambers in the brake control valve device 10, shown in FIGS. 1 and 1A of the drawings, are devoid of fluid under pressure, that the various parts of the brake control valve device 10 are in the respective positions in which they are shown in the drawings, that the brake control valve device 10 is the brake control valve device on a locomotive for controlling the locomotive brakes, that the main reservoir 3 is charged with fluid under pressure to a chosen pressure which, for example, may be 145 pounds per square inch, and that it is desired to initially charge the brake equipment on the locomotive and all the cars in the train hauled thereby.

To effect initial charging of the brake equipment on the locomotive and all the cars in the train, the engineer will move the handle 20 of the automatic brake valve device 7 to its running (i.e., release) position. Movement by the engineer of the handle 20 to its running (i.e., release) position is effective to cause the self-lapping control valve device 12 of the automatic brake valve device 7 to operate in the manner described in detail in the hereinbefore-mentioned Patent No. 2,958,561 to supply fluid under pressure from the main reservoir 3 through the equalizing reservoir cut-off valve device 17 to the relay valve device 11 of the automatic brake valve device 7 to cause operation of the relay valve device 11, in the manner described in aforesaid Patent No. 2,958,561, to supply fluid under pressure from the main reservoir 3 to the brake pipe 1 that extends from end to end of the locomotive and from car to car of the train. Since it has been assumed that the brake control valve device 10, shown in FIGS. 1 and 1A of the drawings, is the brake control valve device for controlling the brakes on the locomotive, fluid under pressure will flow from the brake pipe 1 via the side outlet of the pipe T 62 to the pipe and passageway 61, passageway 215, auxiliary reservoir charging choke 251 and the passageway 250 to the inner seated area of the flat disc-type valve 248. Fluid under pressure thus supplied from the brake pipe 1 to the inner seated area of the flat disc-type check valve 248 is effective to unseat this valve from its annular valve seat 249. When the flat disc-type valve 248 is thus unseated from the annular valve seat 249, fluid under pressure will flow from the passageway 250 to the outlet chamber 252 and thence at an unrestricted rate through the passageway 253 to the passageway 94 in the pipe bracket 38, which passageway 94 is connected by the corresponding pipe to the auxiliary reservoir 4. Fluid under pressure is thus supplied from the main reservoir 3 via the automatic brake valve device 7, the brake pipe 1 and brake control valve device 10 on the locomotive to the corresponding auxiliary reservoir 4 until the pressure therein is substantially the same as the normal fully charged pressure carried in the brake pipe 1, which, for example, may be 70 pounds per square inch.

The fluid under pressure supplied to the outlet chamber 252 also flows through the passageway 90 in the cover 82 to the chamber 89 above the piston 86. Fluid under pressure flows from the auxiliary reservoir 4 via the pipe and passageway 94 to the chamber 88 below the piston 86 so that the pressures acting on the opposite side of this piston are equal. Therefore, the flat disc-type valve 93 is only biased into contact with the annular valve seat 80 by the force of the comparatively light spring 96 and the fluid under pressure acting on the upper side of the flat disc-type valve 93 over an area equal to the area of the annular valve seat 80.

Fluid under pressure that is supplied from the brake pipe 1 to the passageway 61 in the pipe bracket 38 will also flow through that portion of the passageway 61 in the sectionalized casing 39 to the chamber 58 above the diaphragm 47 so that the pressure in the chamber 58 is increased to the normal value of the pressure carried in the brake pipe 1 when fully charged.

Fluid under pressure that is supplied from the brake pipe 1 to the passageway 61 in the pipe bracket 38 and the sectionalized casing 39 also flows therefrom through the passageway 115 having therein control reservoir slow charging choke 116, peripheral annular groove 113 formed on the charging and quick service cut-off valve device 110, thence via the passageways 114 and 154, peripheral annular groove 138 formed on the spool-type combined quick service and selector valve 127, passageway 155, overcharge dissipation choke 156, counterbore 51, passageway 52, and passageway and corresponding pipe 53 to control reservoir 5 to effect charging of the control reservoir from the brake pipe 1 until the pressure in the control reservoir 5 is substantially the same as the normal fully charged pressure carried in the brake pipe 1, which, for example, as hereinbefore stated, may be 70 pounds per square inch. Fluid under pressure supplied to the counterbore 51, in the manner just described, also flows therefrom via the passageway 50 to the chamber 49 below the diaphragm 47 so that this chamber is charged simultaneously with the control reservoir 5. Fluid under pressure supplied to the passageway 155, in the manner explained above, flows therefrom via the branch passageway 155a to the interior of the counterbore 136 and thence via the selector volume charging choke 137, branch passageway 123a, and passageway 123 and the pipe bearing the same numeral to the selector volume 6 to effect charging of this reservoir to the same pressure as that in the brake pipe. The fluid under pressure supplied to the passageway 123 also flows to the chamber 121 on the right-hand side of the diaphragm 119. The fluid under pressure that is supplied from the brake pipe 1 to the passageway 61 extending through the pipe bracket 38 and the sectionalized casing 39 flows from this passageway 61 via the passageway 115 and the passageway 124 to the chamber 122 so that this chamber is charged substantially simultaneously with the chamber 121 on the opposite side of the diaphragm 119.

Fluid under pressure also flows from the passageway 61 in the sectionalized casing 39 via the branch passageway 61a and ports 61b in the bushing 185 to the interior of the counterbore 183 above the larger piston of differential piston member 182. Fluid under pressure thus supplied to the interior of the counterbore 183 is effective to move the differential piston member 182 downward against the yielding resistance of the spring 187 until the lower end of the differential piston member abuts the bottom of the counterbore 186. As the differential piston member 182 is thus moved downward in response to an increase in brake pipe pressure, the stem 192 is likewise moved downward thereby rendering spring 201 effective to move the flat disc-type valve 195 into seating contact with the annular valve seat 194 to close communication between the chamber 198 and the interior of the counterbore 184.

It will be noted that fluid under pressure supplied from the brake pipe 1 to the passageway 61 in the pipe bracket 38 also flows therefrom via the passageway 215 that extends through the pipe bracket and casing 204 to the chamber 213 above the diaphragm 209 so that the pressure in this chamber is the same as that in the brake pipe 1.

Fluid under pressure supplied from the brake pipe 1 to the chamber 213 is effective to deflect the diaphragm 209 downward until the diaphragm follower 208 contacts a stop 204a formed integral with the casing 204. This downward deflection of the diaphragm 209 moves the spool-type quick release valve 207 to the position in which it is shown in FIG. 1.

After the lapse of a period of time necessary to effect charging of the auxiliary reservoir 4, the control reservoir 5, and the selector volume reservoir 6, and the various chambers in the brake control valve device 10 on the locomotive and also charging of the brake equipment on the cars in the train, the pressure of the fluid in the brake pipe 1 will be stabilized by the setting of the self-lapping control valve device 12 of the automatic brake valve device 7 at a normal value of such as, for example, seventy pounds per square inch preparatory to operation of the brake control valve device 10 on the locomotive and the brake control valve devices on all the cars in the train to effect a brake application.

During such initial charging of the brake control valve device 10 on the locomotive, the brake cylinder device 2 on the locomotive will remain vented to atmosphere via the pipe and corresponding passageway 246 that extends through the pipe bracket 38 and the casing 204, the elongated peripheral annular groove 242 on the release selector valve 228, passageway 75 that extends through the casing 204, pipe bracket 38 and sectionalized casing 39, passageway 180, elongated peripheral annular groove 179 on the cup-shaped cylindrical piston member 162 of the service brake cylinder limiting valve device 44, passageway 181, upper end of the bore 79, counterbore 97, port 98 in the stem 78, peripheral annular groove 99 formed on the stem 78, and the exhaust passageway 100 which opens at one end at the wall surface of the bore 79 intermediate the ends of the peripheral annular groove 99 on the stem 78 and at the other end to the exterior of the pipe bracket 38 and has disposed therein a brake cylinder release choke 260 which is carried by the pipe bracket 38.

Since the chamber 164 is connected by the branch passageway 75a to the passageway 75 which is open to the atmosphere, as has just been explained, the chamber 164 will therefore be at atmospheric pressure. Consequently, spring 167 is therefore effective to bias the piston member 162 against the stop 168, in which position the peripheral annular groove 179 on the piston member 162 establishes a communication between the passageway 180 and the passageway 181.

*Graduated service application of the brakes*

To effect a graduated service application of the brakes, the engineer will move the handle 20 of the automatic brake valve device 7 from its running position to a selected position in its service zone corresponding to the degree of brake application desired to effect a reduction in the pressure in the brake pipe 1 at a service rate. Such reduction in brake pipe pressure will occur in chamber 122 of the combined quick service and selector valve device 43 of the brake control valve device 10 on the locomotive since chamber 122 is connected to the brake pipe 1 via passageways 124 and 115, passageway and corresponding pipe 61, and the side outlet of the pipe T 62. When brake pipe pressure has been reduced a slight degree such as, for example, .6 pound per square inch, in the chamber 122, the diaphragm 119 will be deflected in the direction of the left hand, as viewed in FIG. 1A, by the preponderant selector volume reservoir pressure present in the chamber 121 which is connected to the selector volume reservoir 6 via the passageway and corresponding pipe 123. This deflection of the diaphragm 119 is effective to shift the spool-type combined quick service and selector valve 127 in the direction of the left hand from its release position, in which it is shown in FIG. 1A, to a quick service position in which the outturned flange on the left-hand end of the spring seat 134 abuts the sectionalized casing 39, or, in other words, the left-hand end of the chamber 122, without effecting compression of spring 135. It will be noted that this movement of the valve 127 is very prompt because no resistance to movement is offered by the spring 135, only the friction of the O-rings 143 has to be overcome.

Upon movement of the spool-type combined quick service and selector valve 127 to its quick service position, passageway 154 will be cut off from passageway 155, thereby closing the control reservoir slow charging communication extending from the brake pipe 1 to the control reservoir 5 via the side outlet of pipe T 62 (FIG. 1), pipe and passageway 61, passageway 115 (FIG. 1A) having therein the control reservoir slow charging choke 116, peripheral annular groove 113 on the spool-type charging and quick service cut-off valve 110, passageways 114 and 154, elongated peripheral annular groove 138 on the spool-type combined quick service and selector valve 127, passageway 155, overcharge dissipation choke 156, counterbore 51, passageway 52 (FIG. 1), and passageway and corresponding pipe 53. The selector volume reservoir charging communication extending from the passageway 155 to the selector volume reservoir 6 via branch passageway 155a, interior of counterbore 136, selector volume charging choke 137, branch passageway 123a, passageway 123 and corresponding pipe 123 will also be closed upon movement of the spool-type combined quick service and selector valve 127 to its quick service position since the O-ring 143 adjacent the left-hand end of the elongated peripheral annular groove 138 will form a seal with the wall surface of the counterbore 136 between the locations at which the selector volume charging choke 137 and the branch passageway 155a open at the wall surface of the counterbore 136. Since the passageway 155 is connected to the control reservoir 6 via overcharge dissipation choke 156, counterbore 51, passageway 52, and passageway and corresponding pipe 53, it is therefore apparent that the control reservoir 5 is now cut off from the selector volume reservoir 6.

Furthermore, in the quick service position of the spool-type combined quick service and selector valve 127, the O-ring 143 adjacent the right-hand end of the elongated peripheral annular groove 142 will form a seal with the wall surface of the counterbore 136 at a location on the left-hand side of the opening of the one end of the passageway 157 at the wall surface of this counterbore. Since the chamber 122 is connected to the brake pipe 1 via the passageways 124, 115 and 61, the pipe 61 and side outlet of the pipe T 62, fluid under pressure will now flow from the brake pipe 1 and the chamber 122 along the stem 128 to the passageway 157, and thence via the quick service reduction choke 158 to the inner seated area of the flat disc-type valve 159. Fluid under pressure thus supplied to the inner seated area of the flat disc-type valve 159 is effective to unseat this valve from the annular valve seat 160 whereupon it flows therepast and thence through the passageway 161 to the quick service volume 118 (FIG. 1), which is open to atmosphere at this time via the passageway 117 having therein the quick service reduction choke 117a, left-hand end of counterbore 111 (FIG. 1A), passageways 112 and 68, and insect excluder device 71, for effecting a rapid preliminary quick service reduction in brake pipe pressure of a chosen degree. When the quick service volume 118 is charged, fluid under pressure will continue to be released from the brake pipe 1 at a slower rate via the quick service volume 118, the quick service reduction choke 117a, the passageways 117, 112 and 68, and insect excluder device 71 since the end of the passageway 117 opening at the wall surface of the counterbore 111 is open to the passageway 112 by the charging and quick service cut-off valve 110 which is in its charging position.

It will be noted that upon movement of the spool-type combined quick service and selector valve 127 to its quick service position, the O-ring 143, located adjacent the left-hand end of the elongated peripheral annular groove 142, is not moved to a position at the left hand of the location at which the end of the branch passageway 123b opens at the wall surface of the counterbore 136. Since the opposite end of the branch passageway 123b is connected to the passageway 123 which at one end opens into the chamber 121 and at the other end is connected to the pipe bearing the same numeral, which pipe is connected to the selector volume reservoir 6, it is therefore apparent that fluid under pressure in the chamber 121 and the selector volume reservoir 6 (which is at substantially the normal fully charged value of brake pipe pressure) is bottled up or trapped therein while the spool-type combined quick service and selector valve 127 occupies its quick service position.

Fluid under pressure vented from the brake pipe 1 and the chamber 122 to atmosphere via the quick service volume 118 and choke 117a, while the spool-type combined quick service and selector valve 127 occupies its quick service position, will increase the differential of pressure on the diaphragm 119 until this differential of pressure is great enough to deflect the diaphragm 119 in the direction of the left hand against the yielding resistance of the spring 135. This deflection of the diaphragm 119 in the direction of the left hand is effective to shift the spool-type combined quick service and selector valve 127 in the same direction from its quick service position to a service position in which the outturned cup-like annular flange at the left-hand end of the sleeve-like strut 133 abuts the sectionalized casing 39 at the left-hand end of the chamber 122.

In this service position of the spool-type combined quick service and selector valve 127, the O-ring 143, located adjacent the left-hand end of the elongated peripheral annular groove 142, is in a position in which it makes a seal with the wall surface of the counterbore 136 intermediate the locations at which one end of the branch passageway 123b and one end of the passageway 146 open at the wall surface of the counterbore 136. Therefore, while the spool-type combined quick service and selector valve 127 occupies its service position, fluid under pressure will flow from the selector volume reservoir 6 and the chamber 121 at the right-hand side of the diaphragm 119 to the passageway 146 via the pipe and passageway 123, branch passageway 123b, elongated peripheral annular groove 142, the central counterbore 144 which has radial ports opening to the elongated peripheral annular grooves 142 and 140, and the elongated peripheral annular groove 140.

Fluid under pressure thus supplied to the passageway 146 is effective to move the conical-type check valve 150 away from the annular conical valve seat 147 against the yielding resistance of the spring 151 and flow to atmosphere via the insect excluder device 152 until the pressure in the selector volume reservoir 6 and the chamber 121 has reduced to a value such that the reduced brake pipe pressure present in the chamber 122, together with the force of the spring 135, will exceed the fluid pressure force in the chamber 121 whereupon the diaphragm 119 will be deflected in the direction of the right hand to thereby move the spool-type combined quick service and selector valve 127 in this direction from its service position to a lap position in which the O-rings 143 carried by the spool-type combined quick service and selector valve 127 adjacent the respective opposite ends of the peripheral annular groove 141 thereon are disposed on the opposite sides of that end of the branch passageway 123b that opens at the wall surface of the counterbore 136 to thereby close communication between the branch passageway 123b and the passageway 146. Furthermore, in this lap position of the spool-type combined quick service and selector valve 127, the O-ring 143 adjacent the right-hand end of the elongated peripheral annular groove 138 makes a seal with the wall surface of the counterbore 136 at a location that is to the left of the location at which the end of the passageway 154 opens at the wall surface of this counterbore. Consequently, the passageway 154 is cut off from the passageway 155 to prevent charging of the control reservoir 5 and the selector volume reservoir 6 from the brake pipe 1 while the spool-type combined quick service and selector valve 127 is in its lap position.

The reduction in brake pipe pressure resulting from filling of the quick service volume 118 (FIG. 1) and the venting of fluid under pressure from the quick service volume 118 to atmosphere through the continuous quick service reduction choke 117a, in the manner explained above, is effective to hasten the reduction in the pressure in the brake pipe 1 being effected by the engineer's operation of the automatic brake valve device 7 on the locomotive. Consequently, the reduction in pressure thus effected in the brake pipe 1 is effective in the chamber 58 of the service valve device 41 of the brake control valve device 10 on the locomotive. Therefore, the higher pressure in the chamber 49, which pressure is the same as that in the control reservoir 5, will deflect the diaphragm 47 in an upward direction against the yielding resistance of the spring 77, since upward deflection of the diaphragm 47 is transmitted to the diaphragm 48 via the pusher stem 63, and cause the upper end of the stem 78 to first contact the bottom face of the flat disc-type valve 93 to close communication between the interior of the bore 79 and atmosphere via counterbore 97, radial port 98, peripheral annular groove 99, and passageway 100. As the stem 78 continues to be moved upward, the flat disc-type valve 93 will be unseated from the annular valve seat 80. By unseating of the flat disc-type valve 93, fluid under pressure from the auxiliary reservoir 4 flows via pipe and passageway 94 to the chamber 88, thence past the annular valve seat 80 and through the bore 79 to the passageway 181 from whence it flows via the elongated peripheral annular groove 179 on the piston member 162, the passageways 180 and 75, elongated peripheral annular groove 242 on the release selector valve 228 (FIG. 1), and passageway and corresponding pipe 246 to the brake cylinder device 2 to provide a build-up of brake cylinder pressure therein.

Fluid under pressure supplied to the passageway 75, in the manner described above, also flows via the passageway 105 to the chamber 103 at the right-hand side of the diaphragm 101. Fluid under pressure thus supplied to the chamber 103 deflects the diaphragm 101 in the direction of the left hand against the yielding resistance of the spring 109 to move the charging and quick service valve 110 to a cut-off position in which communication is closed between passageways 115 and 114 to cut off charging of the control reservoir 5 and selector volume 6 from the brake pipe 1 so long as brake cylinder pressure is present in chamber 103, and in which communication is closed between the passageways 117 and 112 to terminate flow of fluid under pressure from the quick service volume 118 to atmosphere which terminates initial quick service activity.

Fluid under pressure supplied to the passageway 75 also flows to the chamber 70 to increase the pressure therein. This increase in pressure is effective to establish a force that acts in a downward direction on the upper side of diaphragm 48. Upon this force slightly exceeding the force acting upward on the diaphragm 47, as a result of the reduction of pressure in the chamber 58 caused by the brake pipe reduction, the valve stem 78 will be moved downward until the spring 96 acting through the piston 86 seats the flat disc-type valve 93 on the annular valve seat 80. This cuts off flow of fluid under pressure from the auxiliary reservoir 4 to the brake cylinder device 2.

Therefore, after the pressure of fluid in the brake pipe 1 becomes stabilized at a value determined by the position in its application zone to which the engineer moved the handle 20 of the automatic brake valve device 7 on the locomotive, the supply of fluid under pressure from the auxiliary reservoir 4 to the brake cylinder device 2 on the locomotive will be terminated, it being understood that the supply of fluid under pressure from the auxiliary reservoir on each car in the train to its corresponding brake cylinder device will be likewise terminated. This seating of the disc-type valve 93 on the annular valve seat 80 is effective to hold the desired pressure of fluid in passageway 181 and hence in the brake cylinder device 2.

Fluid under pressure supplied from the auxiliary reservoir 4 to the brake cylinder device 2 on the locomotive via the passageway 75 in the sectionalized casing 39 of the brake control valve device 10 flows from the passageway 75 via the branch passageway 75a to the chamber 164 below the cup-shaped cylindrical piston member 162 of the service brake cylinder limiting valve device 44. Whenever this pressure in the chamber 164 increases to a value sufficient to overcome the force of the spring 167, the piston member 162 is moved upward to cut off further flow of fluid under pressure from the auxiliary reservoir 4 through the brake control valve device 10 to the brake cylinder device 2 on the locomotive. The value of the spring force of the spring 167 thus limits the maximum pressure delivered to the brake cylinder device 2 during a service brake application.

*Graduated release of brakes to any degree*

To effect the first step in a graduated release of the brakes to any degree desired and in any number of desired steps on the locomotive and all the cars in a train subsequent to a partial or full service brake application, the engineer will move the handle 20 of the automatic brake valve device 7 from whatever position it occupies in its service zone in the direction of its running position to a selected position in the service zone corresponding to the higher degree of pressure desired in the brake pipe 1, and therefore to the reduction in pressure to be effected in the brake cylinder device 2 on the locomotive and the brake cylinder devices on all the cars in the train.

As the handle 20 of the automatic brake valve device 7 is thus moved from whatever position it occupied in its service zone in the direction of its running position to the selected position in its service zone, the self-lapping control valve device 12 of the automatic brake valve device 7 operates to supply fluid under pressure from the main reservoir 3 to the relay valve device 11 and to the equalizing reservoir 18, in the manner described in the hereinbefore-mentioned Patent No. 2,958,561. Fluid under pressure thus supplied to the relay valve 11 operates this relay valve device in the manner described in Patent No. 2,958,561 to effect the supply of fluid under pressure from the main reservoir 3 to the brake pipe 1. This supply of fluid under pressure to the brake pipe 1 will flow to the brake pipe extending from car to car in the train and operate the brake control valves on these cars to effect a release of the brakes.

Fluid under pressure supplied to the brake pipe 1 on the locomotive will flow via the side outlet of the pipe T 62, pipe and corresponding passageway 61, and passageways 115 and 124 to the chamber 122 at the left-hand side of the diaphragm 119. As the pressure in the chamber 122 increases in response to the supply of fluid under pressure thereto from the brake pipe 1, a differential of pressure will be established on the opposite sides of the diaphragm 119 which acts in the direction of the right hand, as viewed in FIG. 1A of the drawings. When a differential of pressure of .6 pound per square inch is thus established on the opposite sides of the diaphragm 119, it is effective to deflect the diaphragm 119 in the direction of the right hand and thereby shift the spool-type combined quick service and selector valve 127 from its lap position to its release position, in which it is shown in FIG. 1A.

It will be remembered that when the brake equipment was initially charged prior to effecting a service brake application, the control reservoir 5 was charged from the brake pipe 1 until the pressure in the control reservoir 5 was substantially the same as the normal fully charged pressure carried in the brake pipe 1, which, for example, may be 70 pounds per square inch. Since no reduction in pressure (except for possible leakage) occurred in the control reservoir 5 upon effecting a service brake application, when the spool-type combined quick service and selector valve 127 is shifted from its lap position back to its release position, fluid under pressure will flow from the control reservoir 5 to the selector volume reservoir 6 via pipe and corresponding passageway 53, passageway 52, counterbore 51, overcharge dissipation choke 156, passageway 155, branch passageway 155a, interior of counterbore 136, selector volume charging choke 137, branch passageway 123a, and passageway and corresponding pipe 123. Since one end of the passageway 123 opens into the chamber 121, fluid under pressure supplied from the control reservoir 5 to the selector volume reservoir 6 also flows to the chamber 121 at the right-hand side of the diaphragm 119. Fluid under pressure is therefore supplied from the control reservoir 5 to the chamber 121 simultaneously as fluid under pressure is supplied from brake pipe 1 to the chamber 122 as the handle 20 of the automatic brake valve device 7 is moved toward the hereinbefore-mentioned selected position in its service zone. Upon the handle 20 reaching this selected position, no further increase in pressure in the brake pipe 1 and the chamber 122 will occur. Consequently, the fluid under pressure supplied from the control reservoir 5 to the chamber 121 will establish a differential of pressure on the opposite sides of the diaphragm 119 which acts in the direction of the left hand and is effective to deflect the diaphragm 119 in this direction to shift the spool-type combined quick service and selector valve 127 from its release position back to its lap position to cut off further flow of fluid under pressure from the control reservoir 5 to the selector volume reservoir 6 and the chamber 121.

Fluid under pressure supplied to the brake pipe 1 on the locomotive will also flow via the side outlet of the pipe T 62, and pipe and passageway 61 to the chamber 58 of the service valve device 41. Consequently, fluid under pressure will build up in the chamber 58 above the diaphragm 47 as the engineer on the locomotive moves the handle 20 of the automatic brake valve device 7 to the selected position in the service zone simultaneously as pressure is reduced in the chamber 49 below the diaphragm 47 by the flow of fluid under pressure from the control reservoir 5 to the selector volume reservoir 6 and the chamber 121. Upon the handle 20 of the engineer's automatic brake valve device 7 reaching the selected position, the relay valve device 11 operates to cut off flow of fluid under pressure to the brake pipe 1 and to the train brake pipe extending from car to car through the train.

It will be remembered that when the brake application was effected, fluid under pressure was supplied to the chamber 70 until the force of this fluid under pressure acting downward on the diaphragm 48 balanced the upward force, due to the difference in the pressure in the chamber 58 and the chamber 49 acting upward on the diaphragm 47 and valve stem 78 via the pusher stem 63. Therefore, when pressure in the chamber 58 is increased by a supply of fluid under pressure thereto from the brake pipe 1, this increase in the pressure in the chamber 58 will be effective to deflect the diaphragm 47 downward and thereby render the spring 77 effective to move the stem 78 downward so that the upper end of valve stem 78 is moved away from the lower side of the flat disc-type valve 93 which at this time is biased into contact with the annular valve seat 80 by the spring 96 acting through the piston 86. As the upper end of the valve stem 78 is thus moved downward away from the lower side of the flat disc-type valve 93, the brake cylinder device 2 is vented to atmosphere via pipe and passageway 246, peripheral annular groove 242 on the release selector valve 228, passageway 75, passageway 180, peripheral annular groove 179 on the cylindrical piston member 162, passageway 181, interior of bore 79, counterbore 97, port 98, peripheral annular groove 99 on the stem 78, and the passageway 100 having therein a brake cylinder release choke 260 which controls the rate at which fluid under pressure is released from the brake cylinder device 2.

Chamber 70 has one end of the passageway 75 opening thereinto, and one end of the passageway 105 is connected to the passageway 75 the opposite end of which opens into the chamber 103. Therefore, fluid under pressure will be vented from the chambers 70 and 103 simultaneously as it is vented from the brake cylinder device 2 until the pressure in the chamber 70 is reduced to such a value that the downward pressure acting on the diaphragm 48 is slightly less than the difference in pressure in the chambers 49 and 58 acting upward on the diaphragm 47, so that this upward force is effective to move the stem 78 upward until the upper end of this stem is moved into contact with the bottom of the flat disc-type valve 93 to cut off flow of fluid under pressure from the brake cylinder device 2 and the chamber 70 to the atmosphere. It is therefore apparent that as the pressure in the chamber 58 of the service valve device 41 of the brake control valve device 10 on the locomotive increases in response to the pressure supplied thereto from the brake valve device 7 on the locomotive via the brake pipe 1, the service valve device 41 will operate to reduce the pressure in the brake cylinder device 2 and the chambers 70 and 103 to a degree proportional to the increase in the pressure in the brake pipe 1 effected by movement of the handle 20 of the automatic brake valve device 7 from the position it occupied in its service zone in the direction of its running position to the selected position in its service zone corresponding to the degree of brake pipe pressure desired. It will be understood that the control valves on the cars in the train operate in response to an increase in brake pipe pressure to release the brakes on the corresponding cars.

To effect the second step, and each succeeding step of a graduated release of the brakes, the engineer will move the handle 20 of the automatic brake valve device 7 from the first selected position it occupies in its service zone in the direction of its running position to another selected position in its service zone corresponding to the higher degree of pressure desired in the train brake pipe and therefore the reduced pressure to be obtained in the brake cylinder device 2 on the locomotive and the brake cylinder device on each of the cars in the train.

As the handle 20 of the brake valve device 7 is thus moved in the direction of its running position to another selected position in its service zone, the pressure in the brake pipe 1 and the train brake pipe extending from car to car through the train will be increased in accordance with the amount of arcuate movement of the handle 20 towards its running position whereupon the service valve device 41 of the brake control valve device 10 on the locomotive and the service valve devices of the brake control valve devices on all the cars operate in the manner explained above to reduce the pressure in the corresponding brake cylinder devices and the chambers 70 and 103 of the brake control valve device 10 on the locomotive to a degree proportionate to the increase in the pressure effected in the train brake pipe.

In view of the above, it will be apparent that the engineer may, by moving the handle 20 of the automatic brake valve device 7 in steps towards its running position, effect in successive steps a reduction of the pressure in the chambers 70 and 103 in the brake control valve device 10 and the brake cylinder device 2 on the locomotive and in the corresponding brake cylinder devices on the various cars in the train until this pressure is reduced to a low value.

When the engineer desires to effect the final step in the release of the brakes and, therefore, a complete release of fluid under pressure from the chambers 70 and 103 in the brake control valve device 10, the brake cylinder device 2 on the locomotive, and the brake cylinder devices on all the cars in the train, he will move the handle 20 of the automatic brake valve device 7 on the locomotive to its running position to cause a supply of fluid under pressure to the brake pipe 1 and the train brake pipe extending from car to car through the train for effecting the charging of the brake equipment on the locomotive and cars in the train, in the manner described in detail under initial charging.

From the foregoing, it is apparent that the engineer, by manipulating the handle 20 of the automatic brake valve device 7 on the locomotive, can, by a series of successive steps, partially and then finally fully restore the pressure in the brake pipe 1 and the train brake pipe to correspondingly effect in steps the partial graduated and then finally a complete release of the brakes on the locomotive and the cars in the train.

It may be noted that upon substantial complete release of fluid under pressure from the brake cylinder device 2, and likewise from the chamber 103 of the combined charging and quick service valve device 42, the spring 109 will return the charging and quick service cut-off valve 110 to the position in which it is shown in FIG. 1A of the drawings upon the pressure in the chamber 103 being reduced to a low value which, for example, may be two pounds per square inch. It will be further noted that upon the pressure in the brake pipe being charged to its normal charged value, the pressure in the chamber 122 will likewise be charged to this same value to cause the diaphragm 119 to be deflected in the direction of the right hand and thereby shift the spool-type combined quick service and selector valve 127 from its lap position to its release position, in which it is shown in FIG. 1A of the drawings. Upon the charging and quick service cut-off valve device 110 and the spool-type combined quick service and selector valve 127 being returned to the respective positions, in which they are shown in FIG. 1A, the control reservoir 5 and the selector volume reservoir 6 will be fully charged from the brake pipe 1 via the charging and quick service cut-off valve device 110 and the spool-type combined quick service and selector valve 127, in the manner hereinbefore described in detail.

*Emergency application of the brakes*

To effect an emergency application of the brakes, the handle 20 of the automatic brake valve device 7 (FIG. 1) on the locomotive will be moved to its emergency position to cause a rapid reduction at an emergency rate in the pressure in the brake pipe 1 on the locomotive and in the train brake pipe extending from the locomotive back through the cars in the train until the pressure in the brake pipe 1 and the train brake pipe is reduced to zero or atmospheric pressure. Such reduction in brake pipe pressure will occur in chamber 122 (FIG. 1A) of the combined quick service and selector valve device 43 of the brake control valve device 10 on the locomotive since the chamber 122 is connected to the brake pipe 1 via passageways 124 and 115, passageway and corresponding pipe 61, and the side outlet of the pipe T 62. When brake pipe pressure has been reduced a slight degree such as the hereinbefore-mentioned .6 pound per square inch in the chamber 122, the spool-type combined quick service and selector valve 127 will be shifted from its release position to its quick service position, in the manner hereinbefore described in detail to (1) cut off communication between the brake pipe 1 and the control reservoir 5 and the selector volume reservoir 6, (2) cut off the selector volume reservoir 6 from the control reservoir 5 and bottle up the fluid under pressure in these reservoirs, and (3) connect the brake pipe 1 and the chamber 122 to the quick service volume 118 to cause a rapid preliminary quick service reduction in brake pipe pressure until the quick service volume 118 is charged, after which fluid under pressure will be released from the brake pipe 1 and the chamber 122 to atmosphere at a slower rate via the quick service reduction choke 117a.

The reduction in pressure effected in the chamber 122 while the spool-type combined quick service and selector valve 127 is in its quick service position increases the differential of pressure acting on the diaphragm 119 sufficiently to cause this diaphragm to shift the spool-type combined quick service and selector valve 127 in the manner hereinbefore described from its quick service position to its service position to connect the selector volume reservoir 6 and the chamber 121 to the passageway 146.

Fluid under pressure thus supplied to the passageway 146 is effective to move the conical-type check valve 150 away from the annular conical valve seat 147 against the yielding resistance of the spring 151 and flow to atmosphere via the insect excluder device 152. Since the brake pipe pressure in the chamber 122 is reduced to atmospheric pressure when an emergency brake application is effected, fluid under pressure will flow from the chamber 121 and the selector volume reservoir 6 to atmosphere past the unseated conical-type check valve 150 until the pressure in the chamber 121 and the selector volume reservoir 6 has been reduced to a chosen pressure corresponding to the strength of the spring 151, which chosen pressure, for example, may be, as hereinbefore stated, forty-five pounds per square inch, whereupon the spring 151 will move the check valve 150 into seating contact with the annular valve seat 147. Upon the check valve 150 being thus moved into seating contact with the annular valve seat 147, flow of fluid under pressure from the chamber 121 and the selector volume reservoir 6 to atmosphere is cut off and the remaining fluid in the chamber 121 and the selector volume reservoir 6 trapped therein at the above-mentioned chosen pressure of forty-five pounds per square inch.

From the foregoing, it is apparent that when an emergency brake application is effected, (1) the spool-type combined quick service and selector valve 127 is first moved to its quick service position and subsequently to its service position, the same as when a service brake application is effected to trap the fluid under pressure present in the control reservoir 6, (2) the brake pipe pressure in the chamber 122 at the left-hand side of the diaphragm 119 is reduced to zero or atmospheric pressure, and (3) the pressure in the chamber 121 at the right-hand side of the diaphragm 119 and in the selector volume reservoir 6 is reduced to a chosen pressure which may be, for example, forty-five pounds per square inch.

The reduction in brake pipe pressure effected by movement of the handle 20 of the automatic brake valve device 7 to its emergency position and by operation of the combined quick service and selector valve device 43 to vent fluid under pressure from the brake pipe to the quick service volume 118 and thence to atmosphere via the continuous quick service reduction choke 117a is effective to cause the service valve device 41 of the brake control valve device 10 to operate in the manner hereinbefore described to effect the supply of fluid under pressure from the auxiliary reservoir 4 to the locomotive brake cylinder device 2.

It will be noted that when an emergency brake application is effected and brake pipe pressure is reduced to zero or atmospheric pressure, fluid under pressure acting above the larger piston of the differential piston member 182 is likewise reduced to atmospheric pressure since the upper side of this larger piston is connected to the brake pipe 1 via ports 61b, branch passageway 61a, passageway and corresponding pipe 61, and side outlet of pipe T 62. Therefore, spring 187 is rendered effective to move the differential piston member 182 and the stem 192 upward to the position in which they are shown in FIG. 1A to effect unseating of the flat disc-type valve 195 against the yielding resistance of the spring 201 from its annular valve seat 194. While the flat disc-type valve 195 is unseated, the passageway 181 is connected to the passageway 75 via the passageway 199, chamber 198, counterbore 202, past annular valve seat 194, bore 193, counterbore 184, ports 196 in bushing 185, and passageway 197 in bypass of the service brake cylinder limiting valve device 44. Therefore, fluid under pressure can flow from the auxiliary reservoir 4 to the brake cylinder device 2 in bypass of the service brake cylinder limiting valve device 44 until brake cylinder pressure acting within the counterbore 184 above the smaller piston of the differential piston member 182 has increased sufficiently to overcome the force of the emergency limiting valve spring 187 and move the differential piston member 182 downward against the yielding resistance of the spring 187 to thereby render the spring 201 effective to move the flat disc-type valve 195 into seating contact with the annular valve seat 194 which cuts off further flow of fluid under pressure from the auxiliary reservoir 4 to the brake cylinder device 2. It is therefore apparent from the foregoing that when an emergency brake application is effected, brake cylinder pressure is limited by the operation of the emergency brake cylinder limiting valve device 45 which is connected in bypassing relation to the service brake cylinder limiting valve device 44 and which provides for obtaining a higher brake cylinder pressure than when effecting a service brake application.

It will be understood, of course, that the combined charging and quick service cut-off valve device 42 is operated by the fluid under pressure supplied to the brake cylinder device 2 when effecting an emergency brake application in the same manner as when a service brake application is effected.

Release of the brakes after an emergency brake application

To effect a release of the brakes, subsequent to effecting an emergency brake application, the engineer will move the handle 20 of the automatic brake valve device 7 on the locomotive from its emergency position to its running position to effect the supply of fluid under pressure to the brake pipe 1 and train brake pipe at the usual normal rate for effecting the charging of the brake equipment and a release of the brakes on the locomotive and the cars in the train. The fluid under pressure thus supplied to the brake pipe 1 will flow therefrom via the side outlet of pipe T 62, pipe and corresponding passageway 61, passageway 115 and passageway 124 to the chamber 122 at the left-hand side of the diaphragm 119 of the combined quick service and selector valve device 43. Since the fluid in the chamber 121 at the right-hand side of the diaphragm 119 and in the selector volume reservoir 6 is at the hereinbefore-mentioned chosen pressure which, for example, as hereinbefore stated, may be forty-five pounds per square inch, the supply of fluid under pressure from the brake pipe 1 to the chamber 122 is without effect until the pressure in the brake pipe 1 and chamber 122 increases to a value above forty-five pounds per square inch. As the pressure in the chamber 122 and the brake pipe 1 increases above this chosen pressure of forty-five pounds per square inch, a pressure differential will be established on the diaphragm 119 which is effective to deflect it in the direction of the right hand. This deflection of the diaphragm 119 in the direction of the right hand is effective to shift the spool-type combined quick service and selector valve 127 from its service position back to its release position in which it is shown in FIG. 1A. Upon the return of the spool-type combined quick service and selector valve 127 to its release position, fluid under pressure will flow in the manner hereinbefore described from the control reservoir 5 to the selector volume reservoir 6 and the chamber 121 at the right-hand side of the diaphragm 119. Since fluid under pressure is now being supplied from the brake pipe 1 to the chamber 122 at the left-hand side of the diaphragm 119 simultaneously as fluid under pressure is supplied from the control reservoir 5 to the chamber 121 at the right-hand side of the diaphragm, the pressure in the chamber 121 will not build up above that in the chamber 122 to cause the diaphragm 119 to shift the spool-type combined quick service and selector valve 127 from its release to its lap position.

When an emergency brake application was effected, the brake pipe pressure in the chamber 58 above the large diaphragm 47 of the service valve device 41 was reduced to zero or atmospheric pressure, the auxiliary reservoir pressure of, for example, seventy pounds per square inch, equalized into the brake cylinder device 2 and the chamber 70 above the small diaphragm 48 at a pressure of fifty pounds per square inch while the pressure in the chamber 49 and in the control reservoir 5 remained (except for leakage) at the normal fully charged pressure of, for example, seventy pounds per square inch.

Therefore, fluid under pressure supplied by the brake valve device 7 to the brake pipe 1 will also flow via the side outlet of the pipe T 62, and pipe and passageway 61 to the chamber 58 above diaphragm 47 to increase the pressure in chamber 58 above atmospheric pressure. When the spool-type combined quick service and selector valve 127 is shifted from its lap position to its release position in response to the pressure in the chamber 122 increasing above the chosen pressure of forty-five pounds per square inch, the control reservoir pressure present in the chamber 49 below the diaphragm 47 will begin to decrease as the result of the flow of fluid under pressure from the control reservoir 5 to the selector volume reservoir 6. Therefore, when the increasing brake pipe pressure in the chamber 58, together with the brake cylinder pressure present in the chamber 70 and acting on the upper side of the small diaphragm 48, and the force of the spring 77, establishes a force acting in a downward direction on the diaphragm 47 that exceeds the upward force established thereon by the reducing control reservoir pressure present in the chamber 49, the diaphragm 47 will be deflected downward whereupon the service valve device 41 will operate in the manner hereinbefore described to release fluid under pressure from the brake cylinder device 2, the chamber 70 above the small diaphragm 48 and the chamber 103 of the combined charging and quick service cut-off valve device 42 to atmosphere until the pressure in the chamber 58 is increased to the normal fully charged brake pipe pressure, it being understood that there is no further decrease in the pressure in the chamber 49 subsequent to equalization of control reservoir pressure with selector volume reservoir pressure as the result of the flow of fluid under pressure from the control reservoir 5 to the selector volume reservoir 6 that occurs upon the spool-type combined quick service and selector valve 127 being shifted to its release position.

When the pressure in the chamber 103 has been reduced by operation of the service valve device 41 to the hereinbefore-mentioned low value of, for example, two pounds per square inch, the spring 109 will shift the charging and quick service cut-off valve 110 from its cut-off position back to the charging position, in which it is shown in FIG. 1A. Subsequent to the charging and quick service cut-off valve 110 being returned to its charging position, the control reservoir 5 and the selector volume reservoir 6 will be charged from the brake pipe 1, in the manner hereinbefore described, until the pressure in these reservoirs is the same as the fully charged brake pipe pressure.

*Independent release of locomotive brakes subsequent to effecting a partial or full service brake application on the train*

Let it be supposed that a partial or full service brake application has been effected on the locomotive and cars in the train by manual operation of the automatic brake valve device 7, in the manner hereinbefore described.

Also, let it be supposed that subsequent to effecting a partial or full service brake application on the locomotive and cars in the train, the engineer desires to effect a release of the brakes only on the locomotive, without effecting a release of the brakes on the cars in the train.

To effect a release of the brakes on the locomotive without effecting a release of the brakes on the cars in the train, the engineer will depress the handle 33 (FIG. 1) of the independent brake valve device 8 so that it is rocked clockwise about the pin 34. As the handle 33 is depressed, the roller 35 carried thereby is effective, through the intermediary of the pusher stem 37, to move the release valve 22 downward from the position shown in FIG. 1 to a position in which the peripheral annular groove 32 on the release valve 22 closes communication between the actuating pipe and passageway 30 and the atmospheric vent port 31, and establishes a communication between the actuating pipe and passageway 30 and the passageway and pipe 24 which is connected to the side outlet of the pipe T 25 that is disposed in the main reservoir pipe 26. Therefore, when the release valve 22 is thus moved to its lower position by the engineer manually depressing the handle 33 of the independent brake valve device 8, fluid under pressure will flow from the main reservoir 3 to the chamber 235 below the diaphragm 230 that is operatively connected to the spool-type release selector valve 228 via pipe 28, pipe T 27, main reservoir pipe 26, pipe T 25, pipe and passageway 24, peripheral annular groove 32 on the release valve 22, actuating passageway and pipe 30, side outlet of pipe T 241, pipe and passageway 240, bottom of counterbore 206, and internal passageway 239 in the spool-type release selector valve 228. Fluid under pressure thus supplied from the main reservoir 3 to the chamber 235 causes the diaphragm 230 to be deflected upward against the yielding resistance of spring 237 to thereby shift the spool-type release selector valve 228 upward from the position shown in FIG. 1 to a release position in which passageway 75 is cut off from passageway and pipe 246, passageway 246 is connected via peripheral annular groove 243 on the spool-type release selector valve 228 to the atmospheric vent passageway 247, and passageway 53, which is connected to the control reservoir 5 by the pipe bearing the same numeral, is connected via peripheral annular groove 244 on the spool-type release selector valve 228 to the passageway 216.

Fluid under pressure will now flow from the brake cylinder device 2 on the locomotive to atmosphere via pipe and passageway 246, peripheral annular groove 243, and passageway 247 to thereby release only the brakes on the locomotive.

Also, fluid under pressure will now flow from the control reservoir 5 and chamber 49 (FIG. 1A) which is connected to control reservoir 5 via passageway 50, counterbore 51, passageway 52, and passageway and pipe 53, to the chamber 214 (FIG. 1) below the diaphragm 209 via pipe and passageway 53, peripheral annular groove 244, and passageway 216. At this time, the pressure in the control reservoir 5 and the chamber 49 will usually (unless due to leakage) exceed the pressure in the brake pipe 1 and the chamber 213 above the diaphragm 209 since the brake pipe pressure was reduced in order to effect the aforementioned automatic partial or full service brake application on the locomotive and the cars in the train. Therefore, the fluid under pressure supplied from the control reservoir 5 to the chamber 214 below the diaphragm 209 will be effective to deflect this diaphragm upward against the reduced brake pipe pressure present in the chamber 213 above the diaphragm and shift the spool-type quick release valve 207 from the position in which it is shown in FIG. 1 upward to a quick release position in which the peripheral annular groove 218 on the quick release valve 207 establishes a communication between the branch passageway 216a and the passageway 220. When the branch passageway 216a is thus connected to the passageway 220, fluid under pressure will flow from the control reservoir 5 to the passageway 220. Fluid under pressure thus supplied to the passageway 220 is effective to move the conical-type check valve 224 away from the annular conical valve seat 221 against the yielding resistance of the spring 225 and flow to atmosphere via the insect excluder device 226 until the pressure in the control reservoir 5 and the chambers 49 and 214 has been reduced to a value slightly less than the reduced brake pipe pressure present in the chamber 213 above the diaphragm 209. Upon the pressure in the chamber 214 being thus reduced to a value slightly less than the reduced brake pipe pressure in the chamber 213, this fluid under pressure in the chamber 213 deflects the diaphragm 209 downward to move the spool-type quick release valve 207 downward to a position in which the peripheral annular groove 218 thereon no longer establishes a communication between the branch passageway 216a and the passageway 220. Hence, it is apparent that the pressure in the control reservoir 5 and the chambers 49 and 214 is blown down until it is substantially equal to the reduced brake pipe pressure present in the chambers 213 and 58.

The above-described reduction of pressure in the chamber 49 below the diaphragm 47 of the service valve device 41 to a value that is substantially equal to the reduced brake pipe pressure present in the chamber 58 above this diaphragm causes the spring 77 and the brake cylinder pressure present in chamber 70 to shift the valve stem 78 to its brake release position, in which it is shown in FIG. 1A, in which the passageway 181 is connected to exhaust passageway 100. However, fluid under pressure has been previously vented from the brake cylinder device 2 to atmosphere via the passageway 247 (FIG. 1), in the manner hereinbefore described. Therefore, connecting passageway 181 (FIG. 1A) to exhaust passageway 100 merely releases the fluid under pressure present in the chamber 70 to atmosphere via passageways 75 and 180, peripheral annular groove 179 on the cylindrical piston member 162, passageway 181, bore 79, counterbore 97, port 98, peripheral annular groove 99, and exhaust passageway 100 having therein the brake cylinder release choke 260. Upon the release of fluid under pressure from the chamber 70 to atmosphere, the parts of the service valve device 41 return to the position shown in FIG. 1A of the drawings.

It will be noted that when an independent release of only the locomotive brakes is effected, in the manner described above, pressure in the control reservoir 5 and chamber 49 below the diaphragm 47 of the service valve device 41 is reduced or blown down to a value equal to the pressure to which brake pipe pressure was reduced when effecting a partial or full service brake application on the locomotive and cars in a train by manual operation of the automatic brake valve device 7. Therefore, if subsequent to effecting an independent release of only the locomotive brakes in the manner described above, the pressure in the brake pipe 1 and the chamber 58 above the diaphragm 47 of the service valve device 41 be further reduced in any manner, such as by manual operation of the automatic brake valve device 7 or in response to a burst brake pipe hose or ruptured brake pipe, the retained control reservoir pressure in the chamber 49 and the control reservoir 5 will operate the service valve device 41 in the manner hereinbefore described to effect an application of the locomotive brakes.

*Independent release of locomotive brakes subsequent to effecting an emergency brake application on the train*

An independent release of the locomotive brakes without release of the brakes on the cars can be effected, subsequent to effecting an emergency brake application on the locomotive and cars in the train, in the same manner as hereinbefore described in detail, for effecting an independent release of only the locomotive brakes subsequent to effecting a partial or full service brake application.

However, when the spool-type quick release valve 207 is moved upward to the position in which the peripheral annular groove 218 thereon establishes a communication between the branch passageway 216a and the passageway 220, fluid under pressure in the control reservoir 5 and chambers 49 and 214 will be reduced to a chosen pressure corresponding to the strength of the spring 225, which chosen pressure, for example, may be, as hereinbefore stated, twenty pounds per square inch, whereupon the spring 225 will move the check valve 224 into seating contact with the annular valve seat 221. Upon the check valve 224 being thus moved into seating contact with the annular valve seat 221, flow of fluid under pressure from the control reservoir 5 and the chambers 49 and 214 to atmosphere is cut off and the remaining fluid in the control reservoir 5 and these chambers trapped therein at the above-mentioned chosen pressure of twenty pounds per square inch.

A reapplication of the locomotive brakes can now be obtained by the engineer releasing the handle 33 (FIG. 1) of the independent brake valve device 8. Upon the engineer releasing the handle 33, the spring 29 is rendered effective to return the release valve 22 to the position shown in FIG. 1, whereupon fluid under pressure is released from chamber 235 below the diaphragm 230 to atmosphere via internal passageway 239 in the release selector valve 228, bottom of counterbore 206, passageway and pipe 240, pipe T 241, actuating pipe and passageway 30, peripheral annular groove 32 on release valve 22 and atmospheric vent 31. Upon the release of fluid under pressure from the chamber 235 below the diaphragm 230, the spring 237 above this diaphragm is rendered effective to deflect this diaphragm downward to move the release selector valve 228 downward to the position shown in FIG. 1. In this position of the release selector valve 228, the peripheral annular groove 242 thereon establishes a communication between the passageways 75 and 246.

At this time, the pressure in the chamber 58 (FIG. 1) above the diaphragm 47 of the service valve device 41 is zero or atmospheric as a result of the previously effected emergency brake application on the locomotive and cars in the train, and the pressure in the chamber 49 below the diaphragm 47 and in the control reservoir 5 is at the hereinbefore-mentioned chosen retained pressure, which, for example, may be twenty pounds per square inch. Therefore, this chosen retained control reservoir pressure of twenty pounds per square inch is effective to operate the service valve 41 to its service position in which the flat disc-type valve 93 is unseated from its annular valve seat 80. Therefore, upon the return of the release selector valve 228 to the position shown in FIG. 1 in the manner described above, fluid under pressure will flow from the auxiliary reservoir 4 to the brake cylinder device 2 via pipe and passageway 94, past unseated flat disc-type valve 93, bore 79, passageways 181 and 199, chamber 198, counterbore 202, past unseated flat disc-type valve 195 of the emergency brake cylinder limiting valve 45, bore 193, counterbore 184, ports 196, passageways 197 and 75, peripheral annular groove 242, and passageway and pipe 246 to effect a reapplication of the brakes on the locomotive.

Fluid under pressure supplied to the passageway 75 will flow to the chamber 70 above the diaphragm 48 of the service valve device 41, and when the fluid pressure force acting downward on the diaphragm 48 substantially balances the fluid pressure force, due to control reservoir pressure of twenty pounds per square inch, acting upward on the diaphragm 47, the service valve device 41 will move to lap position to cut off flow of fluid under pressure from the auxiliary reservoir 4 to the locomotive brake cylinder device 2. Thus, the locomotive brakes are reapplied to a degree corresponding to the pressure retained in the control reservoir 5 when an independent release of only the locomotive brakes was effected by the engineer depressing the handle 33 of the independent brake valve device 8.

*Direct release of brakes*

The brake control valve device 10 can be conditioned for direct release operation by removing the plate 261, shown in FIG. 1A, from the sectionalized casing 39, turning it to another position in which it is shown in FIG. 2, and then securing it to the sectionalized casing 39 in any suitable manner (not shown). In this position of the plate 261, a passageway 262 therein establishes a communication between a branch passageway 115a of the passageway 115 and a branch passageway 114a of the passageway 114.

Since the spring-biased conical-type check valve 150 (FIG. 1A) and the spring-biased conical-type check valve 224 (FIG. 1), which constitute the present invention, operate in the same manner when the brake control valve device 10 is conditioned for direct release operation, as they operate when the brake control valve device 10 is conditioned for graduated release operation, a detailed description of the operation of the brake control valve device 10 when conditioned for direct release operation is not deemed necessary to an understanding of the present invention.

Having now described the invention, what I claim as new and desire to secure by Letters Patent, is:

1. In a fluid pressure brake system for railway locomotives and cars, the combination of:
   (a) a brake pipe normally charged with fluid at a certain pressure,
   (b) a selector volume reservoir normally charged with fluid at said certain pressure, and
   (c) a brake control valve device on the locomotive having:
      (i) a service valve device responsive, respectively, to a reduction in brake pipe pressure from said certain pressure to effect a brake application, and to an increase in brake pipe pressure to effect a brake release, and
      (ii) selector valve means controlling a charging communication through which fluid under pressure may normally flow from the brake pipe to the selector volume reservoir, and two release communications of different flow capacities via which fluid under pressure may be released respectively from the brake pipe at a relatively slow rate and from the selector volume reservoir at a faster rate,
      (iii) said selector valve means being subject opposingly to brake pipe pressure and selector volume reservoir pressure and responsive to an initial reduction in brake pipe pressure to below selector volume reservoir pressure at any rate to close said charging communication and open only that one of said release communications through which fluid under pressure may be released from said brake pipe, and
      (iv) said selector valve means being responsive to a consequent reduction in brake pipe pressure effected by flow via the open one of said two release communications to effect opening of the other of said two release communications through which fluid under pressure may be released from said selector volume, and
   (d) means for limiting the reduction in pressure in said selector volume reservoir to a chosen pressure, by flow through the other of said two release communications, which chosen pressure is less than the reduced brake pipe pressure subsequent to operation of said service valve device to effect a full service brake application.

2. A fluid pressure brake system for railway locomotives and cars, as claimed in claim 1, further characterized in that said means for limiting the reduction in pressure in said selector volume reservoir comprises a spring-biased check valve device.

3. In a fluid pressure brake system for railway locomotives and cars, the combination of:
   (a) a brake pipe normally charged with fluid at a certain pressure,
   (b) a selector volume reservoir charged with fluid at said certain pressure,
   (c) a control reservoir charged to a constant pressure corresponding to that normally carried in the brake pipe, and
   (d) a brake control valve device on the locomotive having:
      (i) a service valve device responsive to varying degrees of reduction in brake pipe pressure from said certain pressure relative to the opposing constant control reservoir pressure for effecting a brake application, and to an increase in brake pipe pressure relative to the opposing constant control reservoir pressure for effecting a brake release, and
      (ii) selector valve means controlling charging communications through which fluid under pressure may normally flow from the brake pipe to, respectively, the selector volume reservoir and the control reservoir, and two release communications of different flow capacities via which fluid under pressure may be released, respectively, from the brake pipe at a relatively slow rate and from the selector volume reservoir at a faster rate,
      (iii) said selector valve means being subject opposingly to brake pipe pressure and selector volume reservoir pressure and responsive to an initial operator-effected reduction in brake pipe pressure to below selector volume reservoir pressure at any rate to close said charging communication and open only that one of said release communications through which fluid under pressure may be released from said brake pipe, and
      (iv) said selector valve means being responsive to a consequent reduction in brake pipe pressure effected by flow via the open one of said two release communications to effect opening of the other of said two release communications, through which fluid under pressure may be released from said selector volume, and
   (e) means for limiting the reduction in pressure in said selector volume reservoir to a chosen pressure, by flow through the other of said two release communications, which chosen pressure is less than the reduced brake pipe pressure subsequent to operation of said service valve device to effect a full service brake application.

4. A fluid pressure brake system for railway locomotives and cars, as claimed in claim 3, further characterized in that said means for limiting the reduction in pressure in said selector volume reservoir comprises a spring-loaded check valve device.

5. In a fluid pressure brake apparatus, the combination of:
   (a) a brake pipe normally charged with fluid at a certain pressure,
   (b) a selector volume reservoir normally charged with fluid at said certain pressure,
   (c) valve means controlling a charging communication through which fluid under pressure may normally flow from the brake pipe to the selector volume reservoir and controlling two release communications of different flow capacities via which fluid under pressure may be released respectively from the brake pipe at a relatively slow rate and from the selector volume reservoir at a faster rate,
   (d) said valve means including fluid pressure responsive means subject opposingly to brake pipe pressure and selector volume reservoir pressure and operable by said fluid pressure responsive means responsively to an initial operator-effected reduction in brake pipe pressure, at any rate, below selector volume reservoir pressure to close said charging communication and open only that one of said release communications through which fluid under pressure may be released from said brake pipe, (e) said valve means being operated responsively to a consequent reduction in brake pipe pressure effected by flow via the open one of said two release communications to effect opening of the other of said two release communications through which fluid under pressure may be released from said selector volume, and (f) spring-biased check valve means disposed in said other release communication for limiting the reduction in pressure in said selector volume reservoir to a chosen pressure which is less than the reduced brake pipe pressure subsequent to a full service brake application, (g) said valve means being responsive to an increase in brake pipe pressure above selector volume reservoir pressure to move to a normal position for establishing said charging communication and closing said two release communications.

6. In a fluid pressure brake system for a railway train comprising a locomotive and at least one car, the combination of:

(a) a brake pipe extending through the train and charged with fluid at a certain pressure, (b) a control reservoir charged to a constant pressure corresponding to that normally carried in said brake pipe, (c) a normally vented pipe on the locomotive that is chargeable with fluid under pressure, (d) a brake control valve device on the locomotive having:

(i) a service valve device responsive to varying degrees of reduction in brake pipe pressure relative to the opposing constant control reservoir pressure for effecting a brake application on the locomotive, and to an increase in brake pipe pressure relative to the opposing constant control reservoir pressure for effecting a release of the brake application on the locomotive, (ii) first valve means including fluid pressure responsive means subject opposingly to brake pipe pressure and pressure of fluid in a chamber and operative when pressure in said chamber exceeds brake pipe pressure to release pressure from said chamber, and (iii) second valve means responsive to the charging of said normally vented pipe to connect the control reservoir to said chamber to charge the chamber to the pressure in the control pressure and also effect release of the brake application on the locomotive independently of said service valve device, and (e) means for limiting the reduction in pressure in said control reservoir and said chamber while in communication via said second valve means to a chosen pressure upon the operation of said first valve means subsequent to operation of said second valve means in response to the charging of said normally vented pipe.

7. A fluid pressure brake system for locomotives and cars, as claimed in claim 6, further characterized in that said means for limiting the reduction in pressure in said control reservoir comprises a spring-biased check valve device.

8. A locomotive brake equipment for controlling brakes on a locomotive and on the connected cars of a train, said locomotive brake equipment comprising the combination of:

(a) a normally charged brake pipe, (b) a control reservoir normally containing fluid at the normal charged value of brake pipe pressure, (c) a service valve device for normally causing application and release of locomotive brakes together with the brakes on the connected cars according to the extent of reduction and restoration, respectively, of brake pipe pressure relative to control reservoir pressure, (d) a normally vented pipe that is chargeable with fluid under pressure, (e) valve means normally in one position for establishing a fluid pressure communication whereby locomotive brakes will be controlled by said service valve device and operative to another position responsive to charging of said normally vented pipe for closing said fluid pressure communication so as to cut off control of the locomotive brakes from said service valve device and establish another communication through which fluid under pressure is released to effect the release of locomotive brakes, and (f) other valve means responsive to operation of said valve means to its said another position to effect venting of fluid under pressure from said control reservoir to atmosphere, and (g) spring-biased check valve means for limiting to a chosen pressure the reduction in the pressure in said control reservoir by operation of said other valve means such that upon return of said valve means to its said one position responsive to venting of said normally vented pipe, said service valve device will effect a reapplication of locomotive brakes to the degree that the said chosen pressure retained in the control reservoir exceeds the pressure to which the brake pipe has been reduced.

9. In a railway train brake equipment of the type wherein locomotive brakes are normally controlled together with those on the connected cars of a train, the combination of:

(a) a brake pipe normally charged with fluid at a chosen pressure, (b) a control reservoir charged to a constant pressure corresponding to that normally carried in said brake pipe, (c) a service valve device on the locomotive responsive to varying degrees of reduction in brake pipe pressure relative to the opposing constant control reservoir pressure for effecting a brake application on the locomotive, and to an increase in brake pipe pressure relative to the opposing constant control reservoir pressure for effecting release of a brake application, (d) a normally vented pipe on the locomotive that is chargeable with fluid under pressure, (e) a first fluid pressure operated valve means subject opposingly to brake pipe pressure and pressure of fluid in a chamber and operative when pressure in said chamber exceeds brake pipe pressure to release pressure from said chamber, and (f) a second fluid pressure operated valve means responsive to charging of said normally vented pipe to connect said control reservoir to said chamber and also establish a communication via which release of a brake application on the locomotive is effected independently of said service valve device, and (g) spring-biased check valve means for limiting the reduction in pressure in said chamber and said control reservoir while in communication with each other to a chosen pressure, whereby, upon subsequent venting of said normally vented pipe, said second fluid pressure operated valve means closes said communication and enables said service valve device to effect a reapplication of the brakes on the locomotive to a degree reflecting the differential of the decreased pressure in the control reservoir over the pressure remaining in the brake pipe.

10. A locomotive brake equipment, as claimed in claim 8, and further including independent brake valve means normally in one position for venting said normally vented pipe and operative to another position for supplying fluid under pressure to charge said normally vented pipe.

11. A locomotive brake equipment for controlling brakes on a locomotive and connected cars of a train, said equipment comprising, in combination:
   (a) a normally charged brake pipe,
   (b) a control reservoir normally containing fluid at the normal charged value of brake pipe pressure,
   (c) a service valve means having a passageway therein and being responsive to varying degrees of reduction in brake pipe pressure relative to the opposing control reservoir pressure to provide in said passageway fluid at a pressure corresponding substantially to the magnitude of fluid pressure differential between brake pipe pressure and control reservoir pressure,
   (d) a normally vented pipe that is chargeable with fluid under pressure,
   (e) valve means subject opposingly to brake pipe pressure and pressure of fluid in a chamber and operative to release fluid under pressure from said chamber to substantially the existing value of brake pipe pressure,
   (f) a brake controlling communication to which fluid under pressure is supplied for causing an application of locomotive brakes and from which fluid under pressure is released for causing a release of locomotive brakes, and
   (g) other valve means normally biased to one position for connecting said passageway to said brake controlling communication and cutting off said control reservoir from said chamber and operative to another position responsively to charging of said normally vented pipe to disconnect said passageway from said brake controlling communication and open the latter to atmosphere and connect said control reservoir to said chamber, and
   (h) means for limiting the reduction in pressure in said control reservoir and said chamber to a chosen pressure upon successive operation of said valve means and said other valve means to render said service valve means operative to vent said passageway in consequence of the limited reduction in control reservoir pressure via said chamber and said limiting means so that when said passageway is reconnected to said brake controlling communication upon return of said other valve means to its said one position, fluid under pressure will be supplied to said brake controlling communication by said service valve means to a degree proportional to the excess of control reservoir pressure over brake pipe pressure to cause a reapplication of brakes.

12. In a locomotive brake equipment of the type wherein pressure of fluid in a brake cylinder device on the locomotive is normally increased and decreased according to the degree of reduction and restoration, respectively, in pressure of fluid in a brake pipe relative to pressure of fluid normally bottled up in a control reservoir on the locomotive at substantially the normal charged value of brake pipe pressure, the combination of:
   (a) valve means operative in a release position to connect the control reservoir to a chamber and also establish a communication via which fluid under pressure will be released from the brake cylinder device and operative in a normal position to cut off such connection with communication,
   (b) a communication open to atmosphere,
   (c) quick release valve means controlled by brake pipe pressure opposing pressure of fluid in said chamber and operative whenever said chamber is connected to the control reservoir to effect the supply of fluid under pressure from said chamber and said control reservoir to said communication that is open to atmosphere,
   (d) means for limiting the reduction in pressure in said control reservoir and said chamber to a chosen pressure upon flow therefrom via said communication that is open to atmosphere, and
   (e) means under control of an operator for controlling positioning of the first-mentioned valve means.

References Cited by the Examiner

UNITED STATES PATENTS 2,937,906  5/1960  May ________________ 303—3
3,018,138  1/1962  Wilson et al. _________ 303—36

EUGENE G. BOTZ, *Primary Examiner.*

Dedication 3,272,565.—*Richard L. Wilson*, Trafford, Pa. RAILWAY FLUID PRESSURE BRAKE APPARATUS. Patent dated Sept. 13, 1966. Dedication filed Nov. 27, 1974, by the assignee, *Westinghouse Air Brake Company.*

Hereby dedicates to the Public the entire term of said patent.

[*Official Gazette May 20, 1975.*]